(12) United States Patent
Yamada

(10) Patent No.: US 6,587,298 B1
(45) Date of Patent: Jul. 1, 2003

(54) DEVICE FOR READING AND WRITING TAPE RECORDING MEDIUM, ACCESSING METHOD THEREFOR, AND RECORDING MEDIUM

(75) Inventor: Masaki Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 09/629,725

(22) Filed: Jul. 31, 2000

(30) Foreign Application Priority Data

Jul. 30, 1999 (JP) .......................................... 11-216734

(51) Int. Cl.[7] .......................... G11B 15/18; G11B 15/48
(52) U.S. Cl. ..................... 360/72.1; 360/72.2; 360/74.1
(58) Field of Search ............................... 360/72.1, 72.2, 360/48, 69, 71, 74.1, 74.4, 74.5

(56) References Cited

U.S. PATENT DOCUMENTS 5,774,288 A  * 6/1998 Kikuchi et al. ............... 360/48
6,307,700 B1 * 10/2001 Takayama ................... 360/72.2
2001/0036029 A1 * 11/2001 Nishio et al. ................ 360/72.1

* cited by examiner

Primary Examiner—Andrew L. Sniezek
(74) Attorney, Agent, or Firm—Jay H. Maioli

(57) ABSTRACT

A device for reading and writing data to a tape recording medium divides a magnetic tape into a plurality of partitions. At boundaries between the partitions, optional device areas (ODAs) are formed in which the tape is loaded and unloaded. In each of data areas excluding the ODAs, values of record counts, each indicating the number of recording data, are recorded in a memory in cassette (MIC) in the magnetic tape. When a current position in a predetermined partition is obtained by a host computer, cumulative values of the record count value in each partition are computed. Based on the cumulative values, the current position is computed and output to the host computer.

9 Claims, 32 Drawing Sheets

FIG. 9

| BYTE POSITIONS | LENGTH IN BYTES | NAME OF THE FIELD |
|---|---|---|
| 801 753 | 1 | SET TO ALL ZEROS |
| 801 754 TO 801 756 | 3 | GROUP NUMBER |
| 801 757 TO 801 760 | 4 | RECORD COUNT |
| 801 761 TO 801 764 | 4 | SEPARATOR 1 COUNT |
| 801 765 TO 801 768 | 4 | SEPARATOR 2 COUNT |
| 801 769 | 1 | SET TO ALL ZEROS |
| 801 770 TO 801 772 | 3 | GROUP NUMBER OF THE PREVIOUS RECORD |
| 801 773 | 1 | SET TO ALL ZEROS |
| 801 774 TO 801 776 | 3 | GROUP NUMBER OF THE PREVIOUS SEPARATOR 1 |
| 801 777 | 1 | SET TO ALL ZEROS |
| 801 778 TO 801 780 | 3 | GROUP NUMBER OF THE PREVIOUS SEPARATOR 2 |
| 801 781 801 782 | 2 | BLOCK ACCESS TABLE COUNT |
| 801 783 801 784 | 2 | COUNT OF RECORDS IN THE CURRENT BASIC GROUP |
| 801 785 801 786 | 2 | COUNT OF SEPARATOR 1 IN THE CURRENT BASIC GROUP |
| 801 787 801 788 | 2 | COUNT OF SEPARATOR 2 IN THE CURRENT BASIC GROUP |
| 801 789 OR 801 792 | 4 | SET TO ALL ZEROS |

FIG. 10

| ENTRY OF THE BLOCK ACCESS TABLE |||  |
|---|---|---|---|
| FLAG BYTE | COUNT ||| 
| 1st BYTE | 2nd BYTE (MSB) | 3rd BYTE | 4th BYTE (LSB) |

FIG. 11

| | SETTING | ENTRY |
|---|---|---|
| BEFORE EWP | 0000 0001 | ENTIRE ENTITY |
| | 0000 0010 | START PART OF ENTITY |
| | 0000 0011 | MIDDLE PART OF ENTITY |
| | 0000 0100 | LAST PART OF ENTITY |
| | 0000 0101 | TOTAL COUNT OF ENTITY |
| | 0000 0110 | SEPARATOR MARK |
| | 0000 0111 | SKIP |
| AFTER EWP | 1000 0001 | ENTIRE ENTITY |
| | 1000 0010 | START PART OF ENTITY |
| | 1000 0011 | MIDDLE PART OF ENTITY |
| | 1000 0100 | LAST PART OF ENTITY |
| | 1000 0101 | TOTAL COUNT OF ENTITY |
| | 1000 0110 | SEPARATOR MARK |
| | 1000 0111 | SKIP |

FIG. 15A
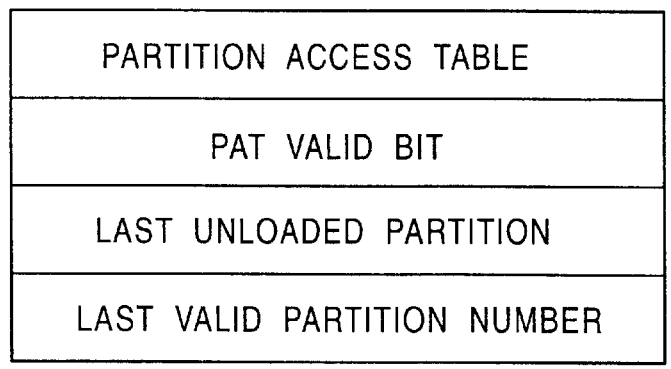
FIG. 15B
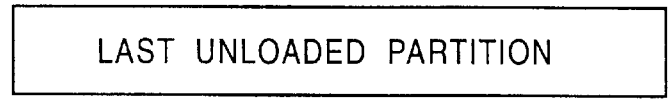
FIG. 16
| PARTITION | #0 | #1 | #2 | #3 | - - - - | #L |
|---|---|---|---|---|---|---|
| RECORD COUNT | r(0) | r(1) | r(2) | r(3) | - - - - | r(L) |
| FILEMARK COUNT | f(0) | f(1) | f(2) | f(3) | - - - - | f(L) |
| SETMARK COUNT | s(0) | s(1) | s(2) | s(3) | - - - - | s(L) |

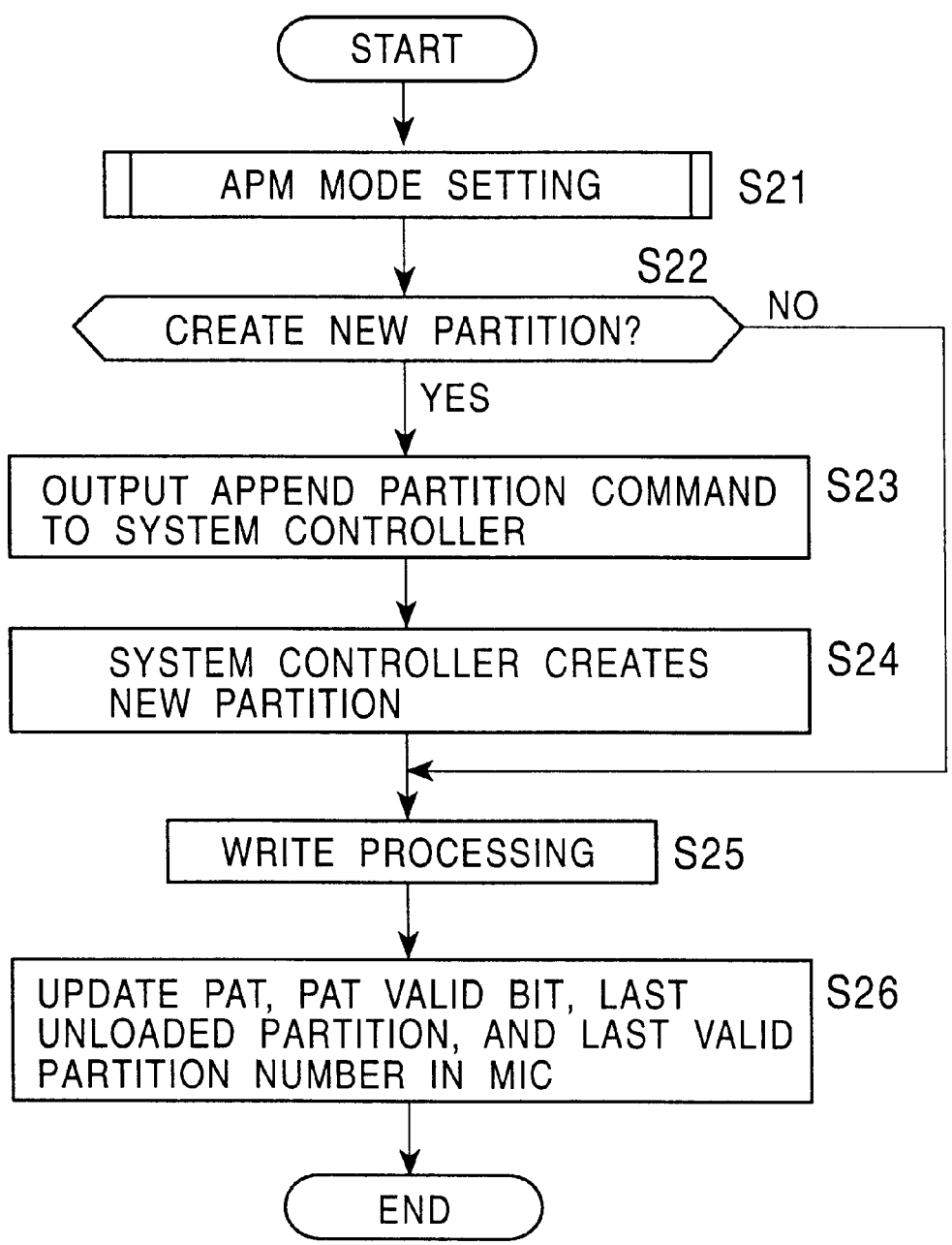

FIG. 20

APM MODE PAT

| PARTITION | #0 | #1 | #2 | #3 | - - - - | #L |
|---|---|---|---|---|---|---|
| RECORD COUNT | R(0) | R(1) | R(2) | R(3) | - - - - | R(L) |
| FILEMARK COUNT | F(0) | F(1) | F(2) | F(3) | - - - - | F(L) |
| SETMARK COUNT | S(0) | S(1) | S(2) | S(3) | - - - - | S(L) |

FIG. 24A

| PARTITION | #0 | #1 | #2 | #3 | - - - - | #L |
|---|---|---|---|---|---|---|
| RECORD COUNT | r(0) | r(1) | r(2) | r(3) | - - - - | r(L) |

FIG. 24B

| PARTITION | #0 | #1 | #2 | #3 | - - - - | #L |
|---|---|---|---|---|---|---|
| RECORD COUNT | R(0) | R(1) | R(2) | R(3) | - - - - | R(L) |

FIG. 25A

| PARTITION | #0 | #1 | #2 | #3 | #4 | #5 | #6 |
|---|---|---|---|---|---|---|---|
| RECORD COUNT | 10 | 10 | 10 | 10 | 10 | 10 | 10 |

FIG. 25B

| PARTITION | #0 | #1 | #2 | #3 | #4 | #5 | #6 |
|---|---|---|---|---|---|---|---|
| SUM | 10 | 20 | 30 | 40 | 50 | 60 | 70 |

FIG. 27A

| PARTITION | #0 | #1 | #2 | #3 | #4 | #5 | #6 |
|---|---|---|---|---|---|---|---|
| RECORD COUNT | 10 | 10 | 10 | 10 | 10 | 10 | 10 |
| FILEMARK COUNT | 0 | 0 | 1 | 0 | 1 | 0 | 1 |
| SETMARK COUNT | 0 | 0 | 0 | 0 | 1 | 0 | 0 |

FIG. 27B

| PARTITION | #0 | #1 | #2 | #3 | #4 | #5 | #6 |
|---|---|---|---|---|---|---|---|
| RECORD COUNT | 10 | 20 | 30 | 40 | 50 | 60 | 70 |
| FILEMARK COUNT | 0 | 0 | 1 | 1 | 2 | 2 | 3 |
| SETMARK COUNT | 0 | 0 | 0 | 0 | 1 | 1 | 1 |

DEVICE FOR READING AND WRITING TAPE RECORDING MEDIUM, ACCESSING METHOD THEREFOR, AND RECORDING MEDIUM

BACKGROUND OF THE INVENTION

1. Field of the Invention

The present invention relates to devices and methods for reading and writing tape recording media, and to recording media. More specifically, the present invention relates to a device and a method for reading and writing a tape recording medium in which a magnetic tape divided into a plurality of partitions is easily managed, and to a recording medium.

2. Description of the Related Art

Tape streamer devices are known as read/write devices for reading or writing (hereinafter referred to as "reading/writing" if necessary) digital data to/from a magnetic tape. Such tape streamer devices have huge recording capacities of, for example, few tens to few hundreds of gigabytes, depending on the tape length of a tape cassette, that is, a medium. Therefore, the tape streamer devices are widely employed for purposes including backup of data written to a medium, such as a hard disk of a computer. In addition, the tape streamer devices are suitable for storing image data or the like whose data size is large.

The above tape streamer devices include, for example, a device for reading/writing data using a helical scan system by a rotary head in which a tape cassette of an 8-mm video cassette recorder (VCR) is used as a recording medium.

Generally, a magnetic tape to or from which data is written or read by the tape streamer device is wound onto a reel rotatably mounted in a cassette casing.

The tape cassette winds and stores the magnetic tape using the reel which is rotatably mounted. There are two types of tape cassettes. One type has a single reel and another type has two reels.

The former type with a single reel is required to rewind the tape before the tape cassette is ejected from the tape streamer device because it has only one reel.

For the latter type with two reels, it is preferable to completely rewind the magnetic tape onto one reel when storing data for a long period of time. When a data recording surface is exposed for a long period of time, dust may adhere to the surface even though the tape is held inside the cassette. For this reason, the tape cassette is generally ejected from the tape streamer device after the magnetic tape is rewound to the head thereof.

Accordingly, when the magnetic tape is required to be rewound to the head and then to be ejected from the tape streamer device, it is necessary to read or write data up to the middle of the magnetic tape, terminate reading or writing at that position, and rewind the magnetic tape to the head when ejecting the tape cassette. Therefore, a long period of time is required from the termination of the reading or writing operation until the tape cassette is actually ejected.

To this end, so-called multi-partitions are proposed in which the magnetic tape is divided into a plurality of partitions, and the magnetic tape can be loaded or unloaded at a boundary between nearest partitions.

Specifically, in the case of a single partition, as shown in FIG. 1A, the magnetic tape is provided with a device area (DA) 1 at the head thereof. After the DA 1 is provided a data area 2 from or to which data is read or written. The magnetic tape is loaded or unloaded at the DA 1, and data is only written to or read from the data area 2. Therefore, as shown in FIG. 1B, a logical block address (LBA) of the magnetic tape has a value increasing in accordance with movement of a tape 1 toward the back end of the tape.

In contrast, in the case of multi-partitions, as shown in FIG. 2A, the data area 2 in FIG. 1A is divided into a plurality of partitions 2-0 to 2-2 (in this example, there are three partitions). The partitions 2-0 to 2-2 have data areas 11-0 to 11-2 at the heads thereof. After the data areas 11-0 to 11-2, optional device areas (ODAs) 12-0 to 12-2 are disposed. As shown in FIG. 2B, the value of the LBA increases from the head to the back end within each of the data areas 11-0 to 11-2 of the partitions 2-0 to 2-2. In different partitions, the value of the LBA changes starting again from 0 to a larger value. Loading or unloading is performed at the DA 1 or the ODA 12-0 to 12-2.

Since the ODAs 12-0 to 12-2 are formed at the boundaries of the partitions 2-0 to 2-2, the magnetic tape is loaded or unloaded after moving from a predetermined position to the nearest ODA. As compared with the case of the single partition shown in FIGS. 1A and 1B, it is not necessary to always rewind the magnetic tape to the DA 1 at the head. It is only necessary to rewind or fast-forward the magnetic tape to the nearest ODA 12-0 to 12-2. This shortens the period of time required to rewind or fast-forward the magnetic tape. As a result, the magnetic tape can be unloaded more quickly.

When the multi-partition structure is used, management of access positions of the magnetic tape becomes complex. Many application programs are only capable of performing address management of single-partitioned magnetic tapes. Often, the application programs do not have a function for managing multi-partitioned magnetic tapes. As a result, when read/write control of the magnetic tape is performed using a number of application programs, it is not possible to quickly unload the tape.

SUMMARY OF THE INVENTION

Accordingly, it is an object of the present invention to perform unloading more quickly.

According to an aspect of the present invention, a device for reading and writing data to a tape recording medium includes a dividing unit for dividing a single tape recording medium into a plurality of partitions so that non-recording areas, for loading and unloading, in which data is not written are provided between adjacent partitions. A first detection unit detects the number of predetermined data units in each of the partitions. A second detection unit detects cumulative values, from the head partition, of the number of data units detected by the first detection unit. An arithmetic operation unit performs arithmetic on an access position on the tape recording medium based on the number of data units from the starting point of the partition to which the access position belongs up to the access position and on a sum of the cumulative values up to a partition immediately before the partition to which the access position belongs.

Preferably, the device includes a storage unit for storing the number of predetermined data units in each of the partitions. The first detection unit may perform detection based on the number of data units stored in the storage unit.

The first detection unit may detect the number of data units in each of the partitions based on the number of data items written on the tape recording medium and a mark indicating a boundary between the data items.

The device may further include a write unit for writing the number of data units in a memory pertaining to a cassette for receiving the tape recording medium.

According to another aspect of the present invention, an accessing method for a device for reading and writing data to a tape recording medium includes a dividing step of dividing a single tape recording medium into a plurality of partitions so that non-recording areas, for loading and unloading, in which data is not written are provided between adjacent partitions. In a detection step, the number of predetermined data units in each of the partitions is detected. In another detection step, cumulative values of the detected number of data units from the head partition are detected. In an arithmetic operation step, arithmetic is performed on an access position on the tape recording medium based on the number of data units from the starting point of the partition to which the access position belongs up to the access position and on a sum of the cumulative values up to a partition immediately before the partition to which the access position belongs.

According to another aspect of the present invention, a medium has recorded thereon a program for controlling reading and writing of data to a tape recording medium. The program includes a dividing step of dividing a single tape recording medium into a plurality of partitions so that non-recording areas, for loading and unloading, in which data is not written are provided between adjacent partitions. In a first detection step, the number of predetermined data units in each of the partitions is detected. In a second detection step, cumulative values, from the head partition, of the number of data units detected in the first detection step are detected. In an arithmetic operation step, arithmetic is performed on an access position on the tape recording medium based on the number of data units from the starting point of the partition to which the access position belongs up to the access position and on a sum of the cumulative values up to a partition immediately before the partition to which the access position belongs.

BRIEF DESCRIPTION OF THE DRAWINGS

FIG. 9 is a table showing an example of a group information table;

FIG. 10 is an illustration of the structure of an entry of a block access table;

FIG. 11 is an illustration of an example of flag bytes shown in FIG. 10;

FIGS. 15A and 15B are illustrations of recording content of a memory in cassette (MIC);

FIG. 16 is a table showing an example of a partition access table (PAT);

FIG. 18 is a flowchart showing a writing process by the tape streamer device shown in FIG. 3;

FIG. 20 is a table showing an example of APM mode PAT;

FIGS. 24A and 24B are illustrations of examples of PAT and the APM mode PAT;

FIGS. 25A and 25B are illustrations of other examples of the PAT and the APM mode PAT;

FIGS. 27A and 27B are illustrations of examples of the PAT and the APM mode PAT.

DESCRIPTION OF THE PREFERRED EMBODIMENTS

The present invention will be illustrated from the following description of preferred embodiments with reference to the accompanying drawings.

A tape streamer device 21 according to an embodiment of the present invention forms at least two partitions on a magnetic tape. Recording data is written to or read from each partition.

Figure 1A:
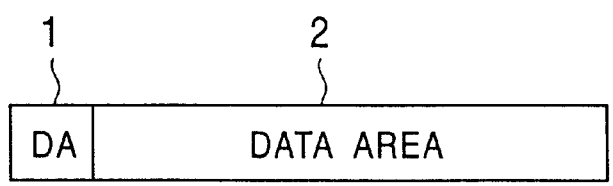
FIGS. 1A and 1B are illustrations of an address of a conventional single partition.
Figure 1B:
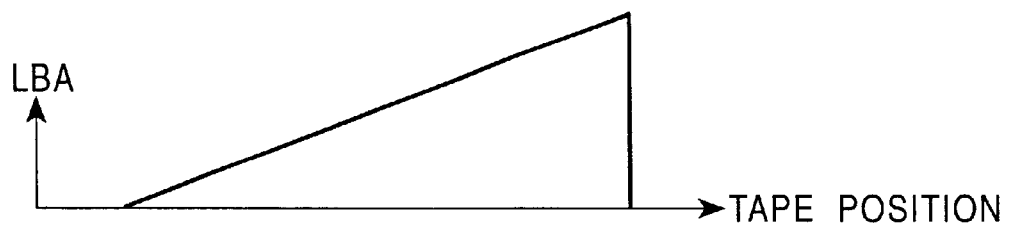
Figure 2A:
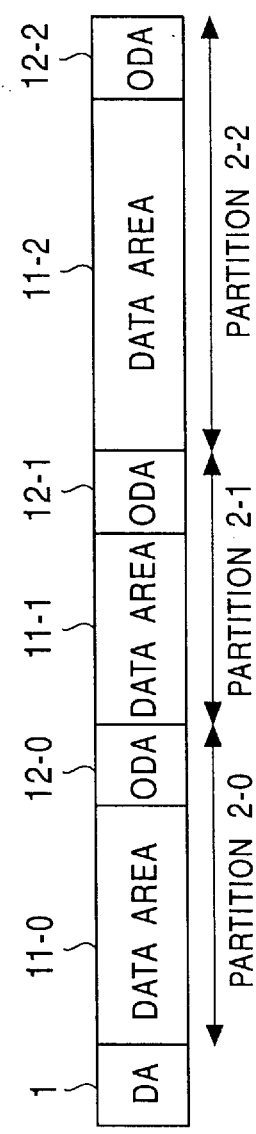
FIGS. 2A and 2B are illustrations of an address of conventional multi-partitions.
Figure 2B:
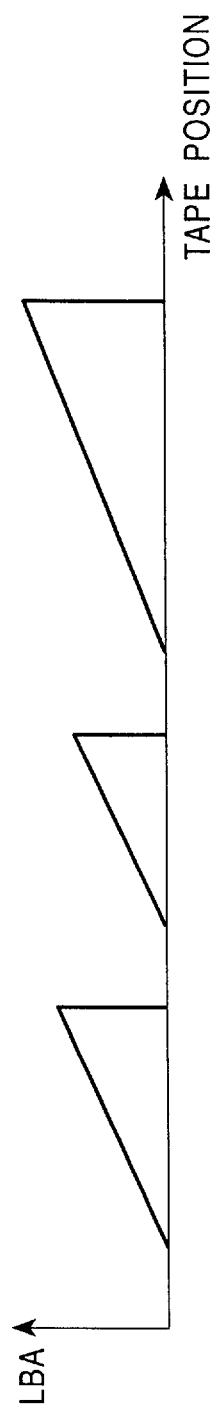
Figure 3:
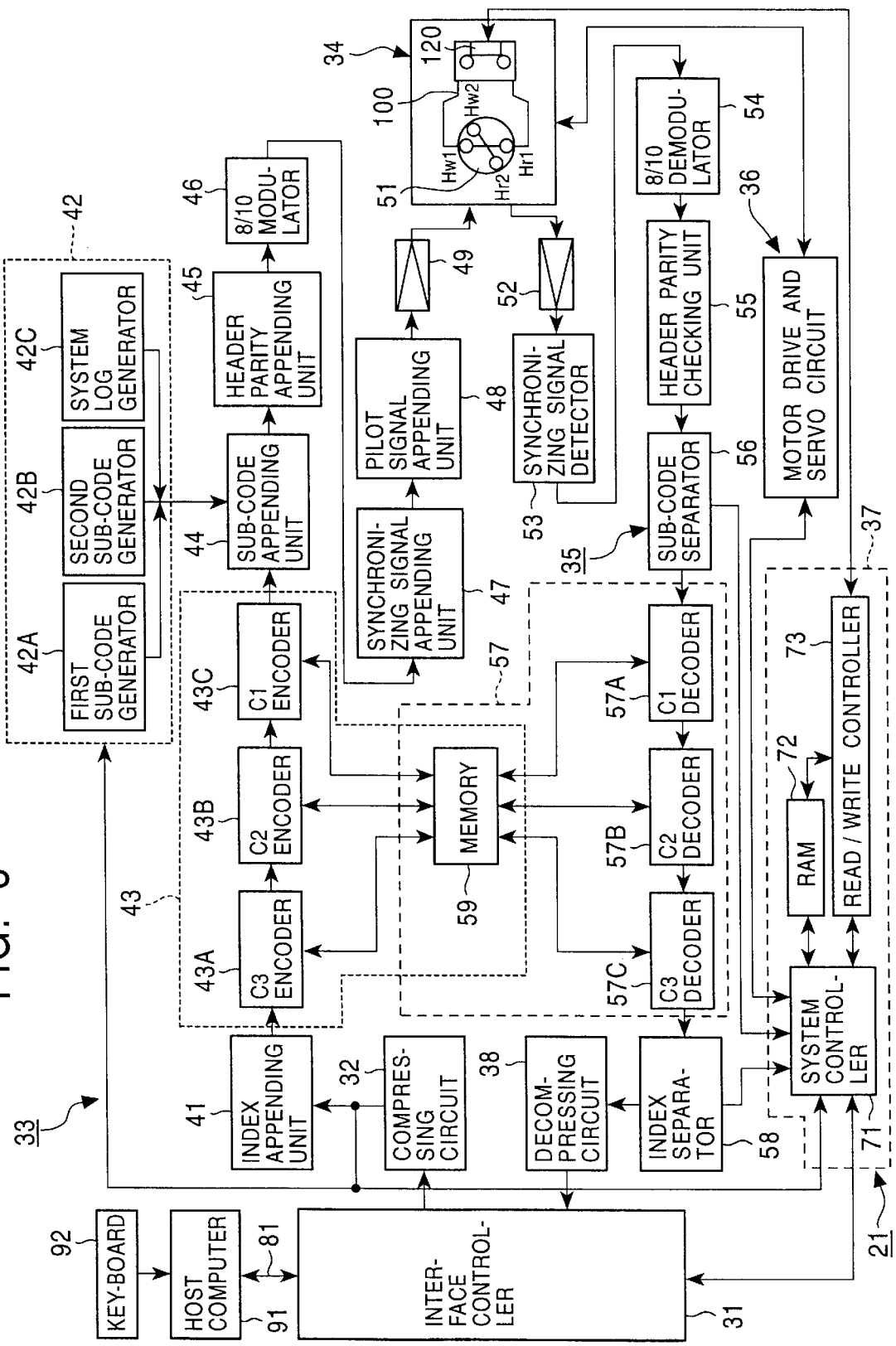
FIG. 3 is a block diagram of an example of a tape streamer/device to which the present invention is applied.

Referring to FIG. 3, the tape streamer device 21 includes a motor drive and servo circuit 36 for controlling the running of a magnetic tape (shown as a magnetic tape 130 in FIG. 6), and a system controller 71 for controlling the motor drive and servo circuit 36 and moving the magnetic tape to an ejection region, which in this case is an optional device area (ODA), provided at the last position in a partition preceding the current partition, thereby ejecting a tape cassette.

The motor drive and servo circuit 36 has a tracking control function and a running control function for controlling the running of the magnetic tape. The running control of the magnetic tape is performed by controlling the rotation of a pinch roller (not shown) or reels 104 and 105 (FIG. 4 and FIG. 5) on which the magnetic tape is wound.

The system controller 71 is a circuit for controlling various circuits. For example, the system controller 71 controls the driving of the motor drive and servo circuit 36.

On the magnetic tape, a plurality of partitions are provided in series in the read/write direction. At the last position of all partitions except for the last partition, ODAs which are regarded as ejection regions are formed. A device area (DA) is formed immediately before the head partition. Details are described below with reference to FIG. 12.

A partition preceding a partition means a partition provided adjacent to the current partition in the direction opposite to the read/write direction.

When unloading the magnetic tape, the tape streamer device 21 feeds the magnetic tape to the ejection region of a partition preceding the partition located at a position before a position at which an unloading command is issued, and then ejects the tape cassette. Accordingly, the tape streamer device 21 is capable of quickly performing the unloading operation.

The tape streamer device 21 shown in FIG. 3 includes an interface controller 31 for externally sending and receiving data, a recording data processor 33 for signal-processing data input via the interface controller 31 and converting the data into a predetermined format, and a read/write unit 34 for writing a signal sent from the recording data processor 33 to the magnetic tape and for reading the magnetic tape. In addition, the tape streamer device 21 includes a read data processor 35 for signal-processing the read output from the read/write unit 34 and for reading the data written to the magnetic tape, and a recording data managing unit 37 for managing data to be written to the magnetic tape.

A tape cassette 100 used for the tape streamer device 21 includes therein a memory, which in this case is a memory in cassette (MIC) 120, as a storage device for storing identification information for identifying data written to the magnetic tape and a system log.

The interface controller 31 is formed of a so-called small computer system interface (SCSI). The interface controller 31 sends data supplied from a host computer 91 including an external personal computer and a workstation via a bus 81 to the recording data processor 33, and sends recording data read by the read data processor 35 to the host computer 91 via the bus 81.

When data is to be written, data is sequentially input to the tape streamer device 21 from the host computer 91 via the interface controller 31 in transmission data units of a record having a fixed length (described below), and the data is sent to a compressing circuit 32. Even though the tape streamer device 21 has a mode in which data is transmitted from the host computer 91 in set units of data having a variable length, a description thereof is omitted. A keyboard 92 or the like is connected to the host computer 91.

The compressing circuit 32 compresses the input data using a predetermined system when it is necessary. When compressing the data by a compression system using an LZ code, an exclusive code is allocated to a previously-processed character string, which in turn is stored in the form of dictionary. A character string input from this time onward is compared with the content of the dictionary. When the character string of the input data matches the code in the dictionary, the data of the character string is replaced by the code in the dictionary. A new code is sequentially provided for the data of the input character string that did not match the dictionary, and the new code is registered in the dictionary. In this manner, the data of the input character string is registered in the dictionary. By replacing the data of the character string by the code in the dictionary, data compression is performed.

The recording data processor 33 includes an index appending unit 41 for appending index information to recording data supplied via the interface controller 31, a sub-code generator 42 for generating a sub-code, an error correction code generator 43 for error-correction-coding the recording data from the index appending unit 41, and a sub-code appending unit 44 for appending the sub-code from the sub-code generator 42 and a block address to the recording data which is error-correction coded.

The sub-code generator 42 includes first and second sub-code generators 42A and 42B, and a system log generator 42C. The error correction code generator 43 includes a memory 59, a C3 encoder 43A, a C2 encoder 43B, and a C1 encoder 43C.

The recording data processor 33 includes a header parity appending unit 45 for appending a header parity to the recording data from the sub-code generator 44, an 8/10 modulator 46 for performing eight-to-ten modulation of the recording data sent from the header parity appending unit 45, a synchronizing signal appending unit 47 for appending a synchronizing signal to the recording data sent from the 8/10 modulator 46, a pilot signal appending unit 48 for appending an automatic track following (ATF) pilot signal for controlling the tracking of the recording data sent from the synchronizing signal appending unit 47, and an amplifier 49 for amplifying the recording data sent from the pilot signal appending unit 48.

Figure 6A:
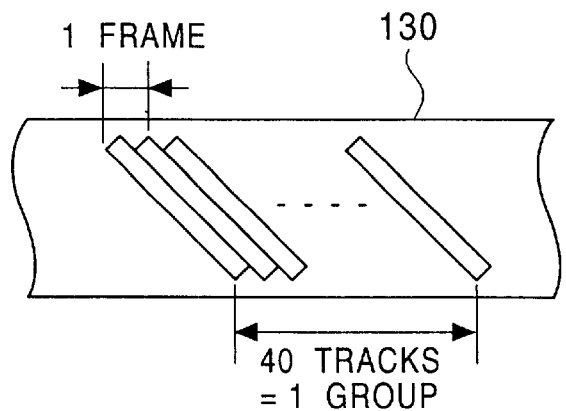
FIGS. 6A to 6C are illustrations of tracks formed by the tape streamer device shown in FIG. 3.

The read/write unit 34 includes a rotating drum 51 for rotating two magnetic writing heads Hw1 and Hw2 having different azimuth angles and two magnetic reading heads Hr1 and Hr2 having different azimuth angles tilted with respect to the magnetic tape 130 shown in FIG. 6A. The two pairs of magnetic heads Hw1 and Hw2 and Hr1 and Hr2 are mounted adjacent to the circumferencial direction of the rotating drum 51 at a distance of a track pitch Tp from the axial direction, that is, the track width direction, of the rotating drum 51.

The read data processor 35 includes an amplifier 52 for amplifying read output from a tilted track of the magnetic tape 130 which is sent from the read/write unit 34, a synchronizing signal detector 53 for detecting a synchronizing signal from the read output of the amplifier 52 and for binarizing the read output, time-correcting the data, and outputting the data, an 8/10 demodulator for performing eight-to-ten demodulation of the binarized read data from the synchronizing signal detector 53, and a header parity checking unit 55 for checking the header parity of the read data from the 8/10 demodulator 54.

The read data processor 35 further includes a sub-code separator 56 for separating the sub-code from the read data sent from the header parity checking unit 55, an error correction processor 57 for performing error correction of the read data from which the sub-code is separated by the sub-code separator 56, and an index separator 58 for separating the index from the read data which is error-corrected by the error-correction processor 57. The error correction processor 57 includes the memory 59, a C1 decoder 57A, a C2 decoder 57B, and a C3 decoder 57C.

The motor drive and servo circuit 36 includes a PG detector, to which a PG pulse in accordance with the rotation of the rotating drum 51 is supplied from the read/write unit 34, for detecting the PG pulse, a speed error detector for detecting a speed error from the detected output of the PG detector, a pilot signal detector for detecting the ATF pilot signal from the read output of the read/write unit 34, an adder for adding detection outputs of the speed error detector and the pilot signal detector, a tracking servo circuit for generating a tracking servo signal based on the addition output of the adder, a capstan drive circuit for controlling a tape running system of the read/write unit 34 based on the tracking servo signal, and the like (none of them is shown).

The motor drive and servo circuit 36 includes a drive control unit (not shown) for controlling the rotation of the reels rotatably mounted in the tape cassette.

The motor drive and servo circuit 36 controls the drive control unit, thus quickly transferring the magnetic tape 130 to a predetermined position. For example, transfer to the ODA described hereinafter can be performed by high-speed feeding.

The operation of the motor drive and servo circuit 36 is controlled by the system controller 71.

The recording data managing unit 37 includes the system controller 71 for managing data to be written to the magnetic tape, a RAM 72 for storing identification information, and a read/write controller 73 for controlling reading to and writing from the RAM 72.

The system controller 71 writes in the RAM 72 a system log or the like for managing a partition provided on the magnetic tape and a file written to the magnetic tape as the identification information. The read/write controller 73 reads the system log stored in the RAM 72 and sends the system log to the MIC 120 via the read/write unit 34. The read/write controller 73 writes the system log read from the MIC 120 in the RAM 72.

The index separator 58 separates index information from the read data in units for which error correction is performed by the error correction processor 57, and sends the index information to the system controller 71 or the like. The index separator 58 sends the read data from which the index information has been separated to a decompressing circuit 38.

Based on the determination by the system controller 71, the decompressing circuit 38 decompresses data compressed by the compressing circuit 32 when the data is written. For uncompressed data, decompression is not performed and the data is processed through and output as it is.

From the decompressing circuit 38, data is output as read data to the host computer 91 via the interface controller 31.

With continued reference to FIG. 3, the MIC 120 provided with the tape cassette 100 is illustrated. When a tape cassette main body is mounted on the tape streamer device 21, the MIC 120 is connected to the system controller 71 via contact terminals 112 (FIG. 5) so that data can be input to and output from the system controller 71.

Mutual transmission of information is performed between the MIC 120 and the external host computer 91 using SCSI commands. Therefore, it is not necessary to provide an exclusive line between the MIC 120 and the host computer 91.

Figure 4:
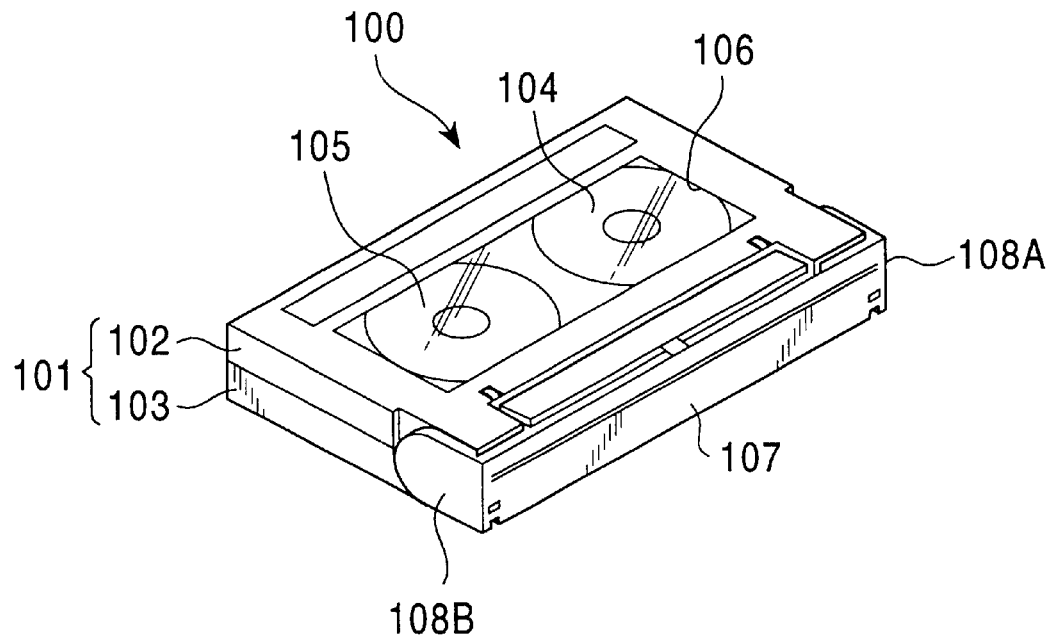
FIG. 4 is a perspective view of an example of a tape cassette mounted in the tape streamer device shown in FIG. 3.
Figure 5:
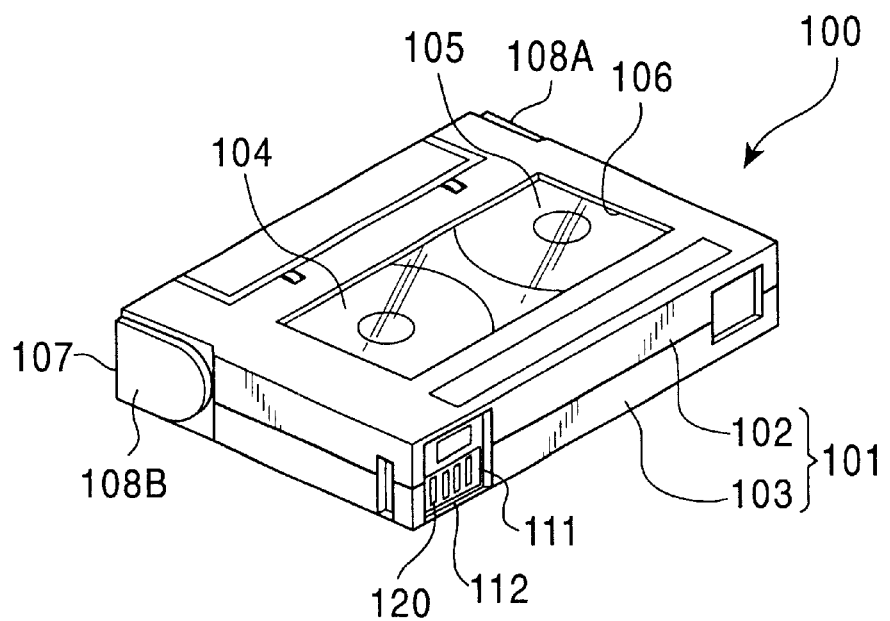
FIG. 5 is a perspective view of another example of a tape cassette mounted in the tape streamer device shown in FIG. 3.

FIGS. 4 and 5 illustrate the structure of the tape cassette 100 to be mounted on the tape streamer device 21.

As shown in FIGS. 4 and 5, for example, a pair of a top half 102 and a bottom half 103 formed of synthetic resin materials in the form of a substantially rectangular flat plate is assembled so that open sides thereof are butted together. Subsequently, the top half 102 and the bottom half 103 are bonded together by a plurality of screws, thus constructing a cassette main body 101 having a substantially box shape. The cassette main body 101 stores therein a rotatable tape feeding reel 104 and a rotatable tape winding reel 105, disposed in line in the longitudinal direction, on which the magnetic tape 130 is wound.

The cassette main body 101 is provided with a rectangular display window 106 on a ceiling surface of the top half 102 constructing a top surface portion. Therefore, it is possible to visually observe the state of the magnetic tape 130 wound on the tape feeding reel 104 and the tape winding reel 105 stored in the cassette main body 101. On the bottom half 103 constructing a bottom surface portion, the cassette main body 101 is provided with hub engaging holes (not shown) corresponding to each reel. The hub engaging holes cause part of hubs of the tape feeding reel 104 and the tape winding reel 105 to face outside, and control the rotation of the tape feeding reel 104 and the tape winding reel 105. On the bottom surface portion of the bottom half 103, various identification holes (not shown), such as a tape-length detecting hole for detecting the length of the magnetic tape 130 and a tape-type identifying hole for identifying the type of the magnetic tape 130, are provided.

The tape feeding reel 104 and the tape winding reel 105 are formed by the cylindrical hubs on which the magnetic tape is wound, and disk-shaped flanges are provided on one side of the hubs. The tape feeding reel 104 and the tape winding reel 105 are rotatably stored in the cassette main body 101 by engaging the hubs with the corresponding hub engaging holes. The tape feeding reel 104 and the tape winding reel 105 are prevented from rattling in the cassette main body 101 by urging the center of rotation of the hubs against the bottom half 103 using a reel cap spring and a reel cap plate (not shown).

The cassette main body 101 is provided with a rotatable covering member 107 for closing the front portion thereof from which the magnetic tape is externally discharged. The covering member 107 has substantially the same length as the width of the cassette main body 101. Sidewall portions 108A and 108B forming pivots opposing each other are integrally formed at both ends of the covering member 107. Hence, the entire covering member 107 has substantially a U shape. Pin axes are integrally formed at the interior of the sidewall portions 108A and 108B so that the axes coincide with each other. Because the pin axes are rotatably supported by the cassette main body 101, the covering member 107 can open and close the front portion of the cassette main body 101.

The tape cassette 100 is provided at the back thereof with a terminal aperture 111. An auxiliary storage device is mounted on the terminal aperture 111. The auxiliary storage device is formed by the MIC 120 formed of a non-volatile memory mounted on a circuit board and the contact terminals 112 formed on the circuit board as input/output terminals of the MIC 120.

The MIC 120 includes a storage device and an input/output controller for controlling data input/output with the read/write controller 73 connected to the MIC 120 via a connector.

Referring now to FIG. 6A, diagonal recording tracks are sequentially written and formed on the magnetic tape 130 by the magnetic heads Hw1 and Hw2. A group is formed of 40 tracks, i.e., 20 frames, and a partition is formed of a plurality of groups. In other words, recording units of data in a partition are arranged into a group, and that group is formed of 20 frames, i.e., 40 tracks, as shown in FIG. 6A.

Figure 6B:
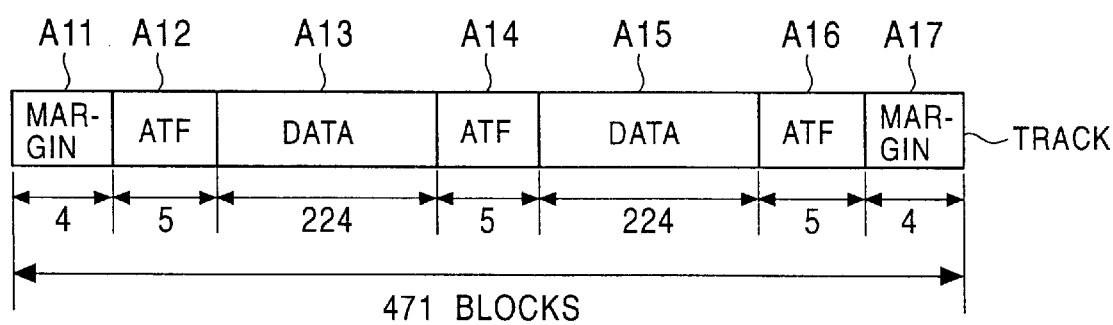

Referring to FIG. 6B, a track is formed of 471 blocks. At both ends of the track, margin areas A11 and A17 each occupying four blocks are provided. ATF areas A12 and A16 for performing tracking control are provided after the margin area A11 and before the margin area A17. In addition, an ATF area A14 is provided at the middle of the track. The ATF areas A12, A14, and A16 each occupy a length of five blocks.

Between the ATF areas A12 and A14, and between the ATF areas A14 and A16, data areas A13 and A15 each occupying 224 blocks are provided, respectively. Therefore, all data areas (A13 and A15) in a track occupy 224×2=448 blocks out of the entire 471 blocks. A main data region is a region including the data areas A13 and A15 and the margin areas A11 and A17.

Figure 6C:
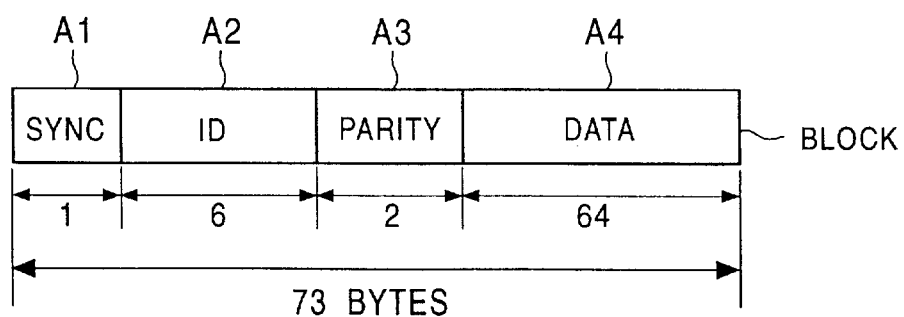

Referring to FIG. 6C, a block is formed of a total of 73 bytes including a 1-byte first segment (SYNC data area A1) for recording a synchronizing signal, a 6-byte second segment (ID area A2) for recording an ID, a 2-byte third segment (parity area A3) for recording a header parity, and a 64-byte fourth segment (data area A4) for recording data. A sub-code and a block address are written along with data every block.

Figure 7:
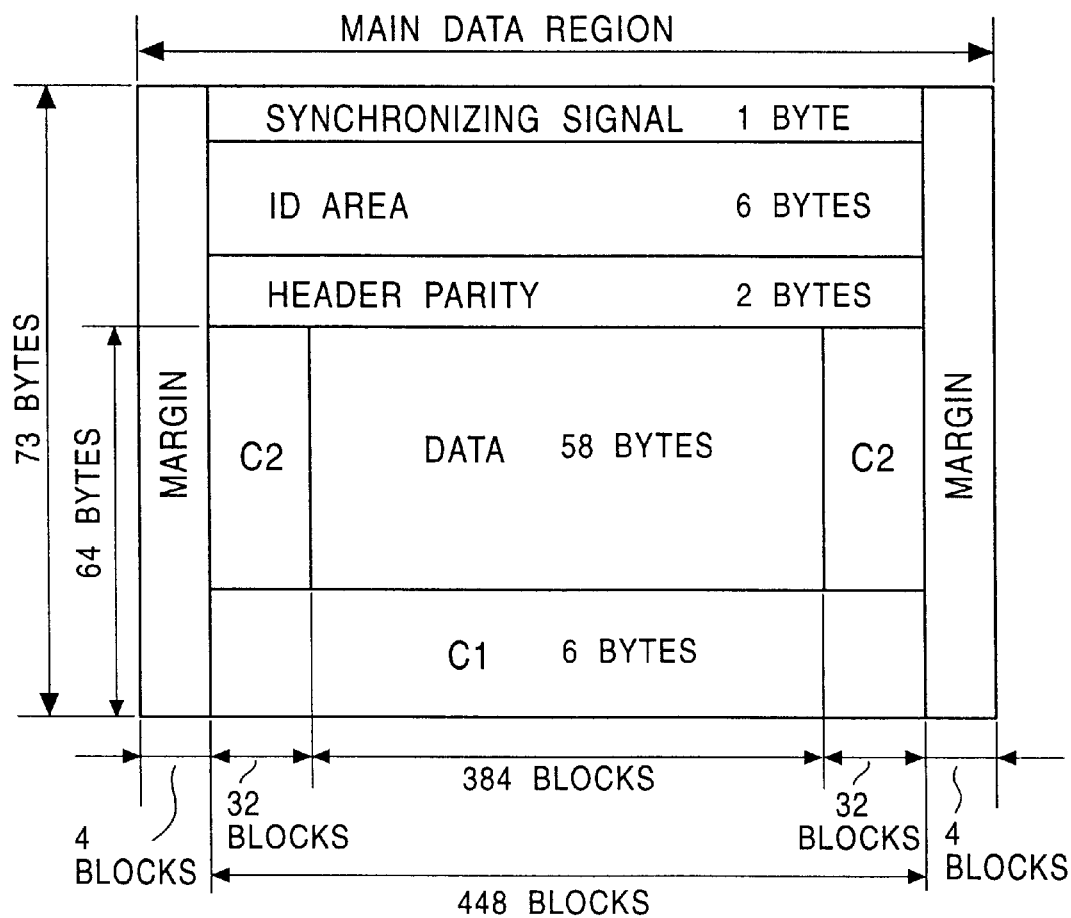
FIG. 7 is an illustration of a format of data areas on a single track.

Referring to FIG. 7, data to be recorded in the data area A4 of the data areas A13 and A15 is constructed as follows. Data occupying 64 bytes×448 blocks, in which two-dimensional error correction codes C1 and C2 are appended every blocks of 58 bytes×384 blocks, i.e., 22272-byte data, is separated per block. The error correction code C1 is appended to the main data of each block, and is written. The error correction code C2 is divided into two parts, each having 32 blocks, to be appended to both ends of the main data region of each track, and is written.

Figure 8:
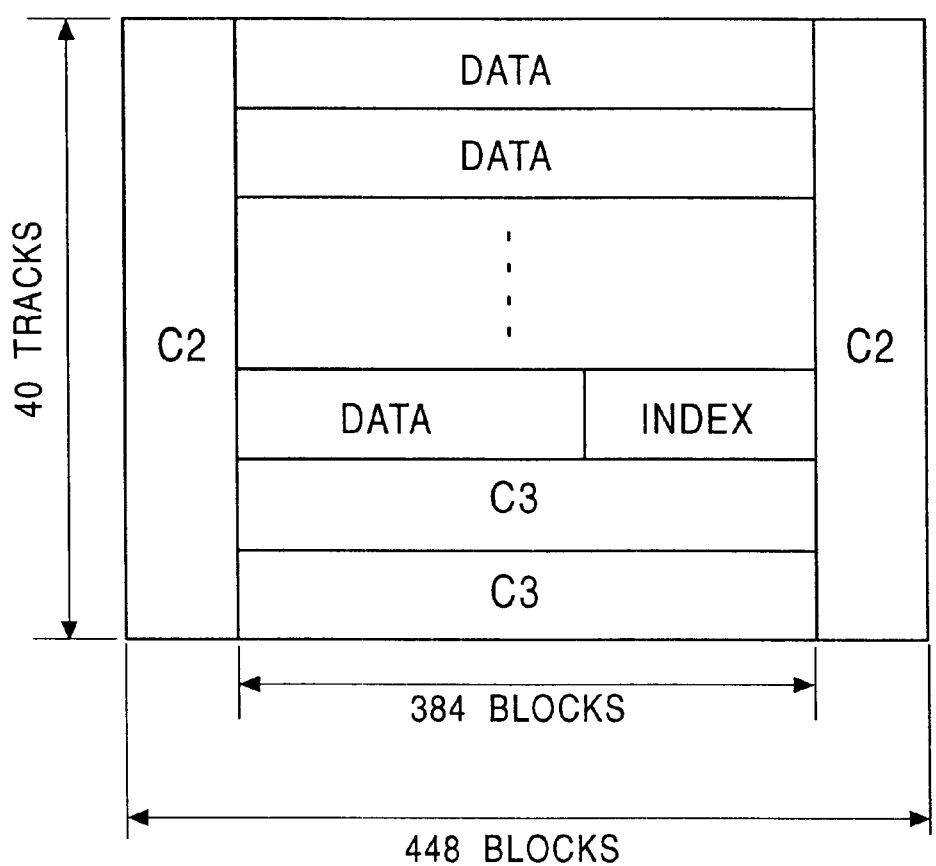
FIG. 8 is an illustration of a format of data areas in a group.

The tape streamer device 21 uses an error correction code configuration having 40 tracks, i.e., 20 frames (one frame is formed of two tracks, namely, 942 blocks) as a unit (group). Referring now to FIG. 8, the error correction code C2 of a data string corresponding to the track direction is disposed at both sides of the track, and is written. An error correction code C3 of a data string corresponding to the track width direction is allocated to the final two tracks, and is written. Index information for identifying a series of data is appended every unit.

The sub-code includes a separator count as delimiter information for indicating the separation of the main data, a record count for indicating the number of records, an area ID for indicating each region defined on a tape format, a frame number for indicating an absolute position in recording units, a group count for indicating the number of recording units, and a checksum.

The index information is formed by a group information table (GIT) and a block access table (BAT). In the GIT, information as shown in FIG. 9 is written. For example, a group number indicates the group number of a group written by this GIT. A record count indicates the sum of counts of records in the current basic group in the GIT of the whole groups from a logical beginning of tape (LBOT), which is the head position of the first partition, to the current group. A separator mark is counted as records.

A separator 1 count indicates the number of separators 1 (filemarks) from the LBOT to the current group. A separator 2 count indicates the number of separators 2 (setmarks) from the LBOT to the current group.

The BAT is formed of at least one entry. As shown in FIG. 10, the entry is formed of a 1-byte flag and a 3-byte count. The flag is defined as shown in FIG. 11. For example, when the entry is the separator mark, '00000110' is written to the flag. When the entry is the separator 1, zero is written to the count. When the entry is the separator 2, one is written to the count.

The basic operation of the tape streamer device 21 having the above structure is described. When writing data by the tape streamer device 21, recording data is sent from the host computer 91 via the interface controller 31. When the recording data is sent to the interface controller 31 via the bus 81, the interface controller 31 compresses the sent recording data using the compressing circuit 31 as circumstances demand, and sends the recording data to the index appending unit 41 and the sub-code generator 42.

When the recording data is sent to the index appending unit 41 from the interface controller 31, the index appending unit 41 appends index information for identifying a series of recording data in units of 40 tracks, i.e., 20 frames (one group) to the sent recording data, and sends the recording data to the error correction code generator 43.

The error correction code generator 43 temporarily stores the recording data sent from the index appending unit 41 in the memory 59 in single units (one group). The C3 encoder 43A generates the error correction code C3 of a data string corresponding to the track width direction (the vertical direction in FIG. 8) for the recording data stored in the memory 59 in single units, and allocates the error correction code C3 to the final two tracks of the 40 tracks of one group, as shown in FIG. 8. The C2 encoder 43B generates the error correction code C2 of a data string corresponding to the track direction (the horizontal direction in FIG. 8), divides the error correction code C2 into two parts, and allocates the two parts to both ends of the main data region of each track, as shown in FIG. 8. The C1 encoder 43C generates the error correction code C1 for each block, as shown in FIG. 7.

In contrast, the first sub-code generator 42A of the sub-code generator 42 generates a separator count as delimiter information for indicating the separation of the recording data, and a record count for indicating the number of recording blocks, based on the recording data input via the interface controller 31. The second sub-code generator 42B generates a block address along with an area ID for indicating each region defined on a tape format, as shown in FIGS. 6B and 6C, a frame number, a group count for indicating the number of recording units, a checksum, and the like. The system log generator 42C generates a system log, i.e., historical information, for each partition specified as the tape format.

The sub-code appending unit 44 appends the sub-code and the block address sent from the sub-code generator 42 to the recording data to which the error correction codes C3, C2, and C1 are appended by the error correction code generator 43. Accordingly, the sub-code and the block address are allocated to the second segment (the ID area A2 in FIG. 6C) of each block.

The header parity appending unit 45 generates a 2-byte parity for error correction for the sub-code and the block address appended to the recording data by the sub-code appending unit 44, and appends the 2-byte parity to the recording data. Accordingly, the parity is allocated to the third segment (the parity area A3 in FIG. 6C) of each block.

The 8/10 modulator 46 converts the recording data in the main data region to which the header parity and the block address are appended by the header parity appending unit 45 and the sub-code generator 44 from 8-bit data to 10-bit data in units of 1 byte, thereby maintaining the DC level of a signal to be written substantially at zero.

The synchronizing signal appending unit 47 appends a synchronizing signal to the recording data, which is converted to 10-bit data by the 8/10 modulator 46, every block. Accordingly, the synchronizing signal is allocated to the first segment (the SYNC data area A1 in FIG. 6C) of each block. The recording data generated as above is sent to the pilot signal appending unit 48.

The pilot signal appending unit 48 generates an ATF pilot signal, appends the ATF pilot signal to the recording data, and sends the recording data to the magnetic heads Hw1 and Hw2 via the amplifier 49. Accordingly, the magnetic heads Hw1 and Hw2 scan the magnetic tape 130 and perform writing, forming recording tracks on the magnetic tape 130 in a predetermined format.

Alternatively, partitions may be formed in advance on the magnetic tape 130 prior to writing as described above. Details of the process are described with reference to FIG. 13. In this case, the system controller 71 generates partitions on the magnetic tape 130, generates partition management information indicating the number of partitions, the starting point of each partition, and the like, and writes the management information in the RAM 72.

When a directory is created, deleted, or changed in a partition, or when a file is recorded, deleted, or changed in a directory, the system controller 71 reads identification information on each file from the RAM 72. The system controller 71 then changes the identification information in accordance with the above writing operation or the like, and writes the identification information in the RAM 72. When writing, deleting, or changing a file, the system controller 71 reads management information for managing the recording position of each file from the RAM 72. The system controller 71 then changes the management information in accordance with a new recording position of the file, and writes the management information in the RAM 72.

When management information on each partition, identification information on each file, and management information for managing the recording position of each file stored in the RAM 72 are updated, the read/write controller 73 writes the updated partition management information in the MIC 120 via the contact terminals 112 of the tape cassette 100 by the read/write unit 34.

Accordingly, the data is written on the magnetic tape 130 in file units, and the identification information on each file or the like written on the magnetic tape 130 is written in the MIC 120.

When recording data on a plurality of tape cassettes 100, the system controller 71 generates information about all the tape cassettes 100 on which the data is written, identification information for identifying each of the tape cassettes 100 on which the data is written, and identification information for identifying the data written on each of the tape cassettes 100. The read/write controller 73 stores the identification information in the RAM 72.

When reading the magnetic tape 130 for which the writing operation is performed as above, the operation of the tape streamer device 21 is as follows. When the tape cassette 100 is mounted on the read/write unit 34, the contact terminals 112 are exposed from the terminal aperture 111. The exposed terminal contacts 112 are connected to the read/write controller 73 via a connector (not shown) of the read/write unit 34.

The read/write controller 73 reads the management information, the identification information on each file, and the management information for managing the recording position of each file from the MIC 120 via the connector and the contact terminals 112, and writes the information in the RAM 72.

In contrast, in response to an instruction from the system controller 71 to read the magnetic tape 130, the read/write unit 34 controls the rotation of the rotating drum 51 so that the rotation rate of the rotating drum 51 is the same as when writing. Also, the system controller 71 controls the running of the magnetic tape 130 so that the magnetic tape 130 runs at a constant speed. Accordingly, the magnetic reading heads Hr1 and Hr2 scan the magnetic tape 130 at a tilt, and the magnetic heads Hr1 and Hr2 send the read output in accordance with the scanning of the recording track to the synchronizing signal detector 53 via the amplifier 52. The synchronizing signal detector 53 detects a synchronizing signal from the sent read output, and binarizes the read output using a clock in synchronism with the synchronizing signal. The synchronizing signal detector 53 generates read data and sends the read data to the 8/10 demodulator 54.

The 8/10 demodulator 54 converts the read data from the synchronizing signal detector 53 from 10-bit data to 8-bit data, and sends the read data to the header parity checking unit 55. The header parity checking unit 55 performs a parity check on the sub-code and the block address using the 2-byte header parity. The sub-code separator 56 separates from the read data a correct sub-code on which the parity check is performed by the header parity checking unit 55, and sends the correct sub-code to the system controller 71. The sub-code separator 56 sends the read data from which the sub-code is separated to the memory 59.

The memory 59 temporarily stores the read data to which the index information is appended in units of 40 tracks, i.e., 20 frames (one group) of read data. The C1 decoder 57A performs error correction of the read data of each block using the error correction code C1 appended every block based on the read data stored in units in the memory 59.

The C2 decoder 57B performs error correction of a data string corresponding to the track direction using the error correction code C2 appended to both ends of the read data region of each track for the read data which is error-corrected in units by the C1 decoder 57A. The C3 decoder 57C performs error correction of a data string corresponding to the track width direction using the error correction code C3 allocated to the final two tracks of 40 tracks per unit for the read data which is error-corrected in units by the C2 decoder 57B.

Since the read data is error-corrected using the error correction codes C1, C2, and C3, the tape streamer device 21 can reliably correct errors in the read data and to improve reliability of the read data.

The index separator 58 separates index information from the read data which is error-corrected in units by the error correction processor 57 as described above, and sends the separated index information to the system controller 71 and the like. The index separator 58 sends the read data from which the index information is separated to the decompressing circuit 38.

The decompressing circuit 38 decompresses the read data if the read data has been compressed, and outputs the data to the interface controller 31. The interface controller 31 transmits the read data from the decompressing circuit 38 to the host computer 91 via the bus 81.

Figure 12:
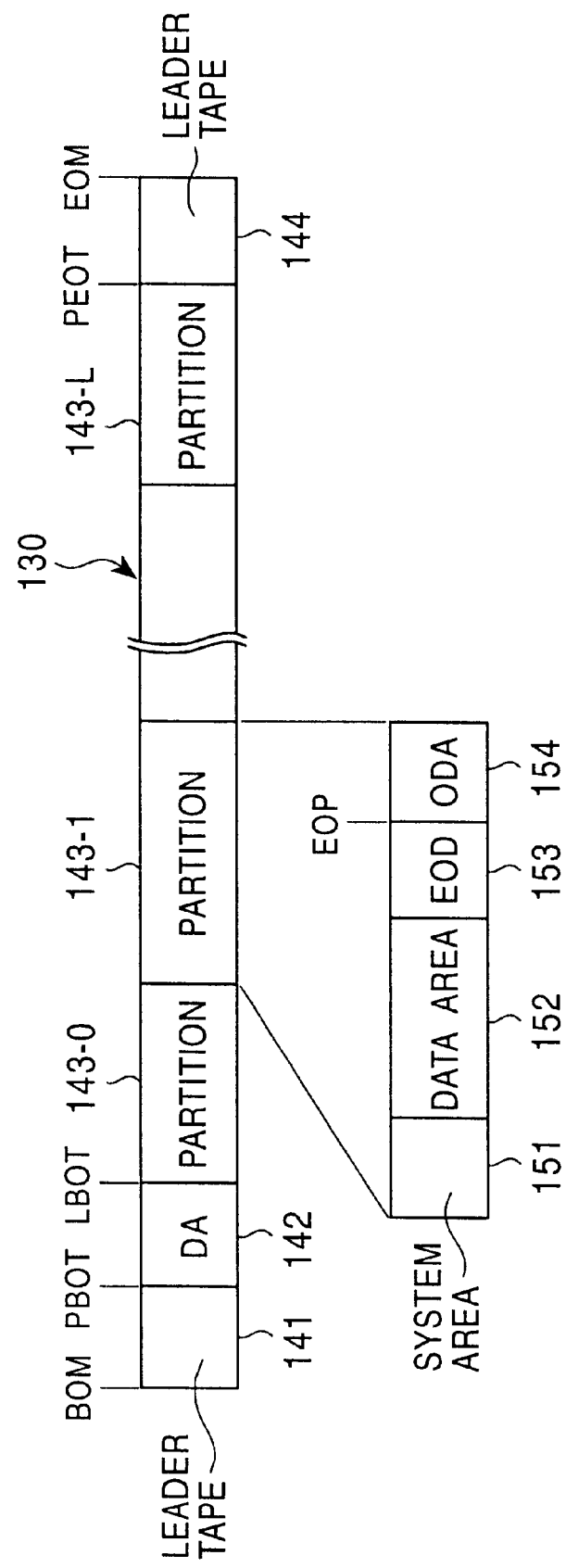
FIG. 12 is an illustration of the structure of partitions on a magnetic tape.

FIG. 12 shows the structure of partitions formed on the magnetic tape 130. As shown in FIG. 12, the head of a leader tape 141 is regarded as a beginning of media (BOM). The head of a DA 142 following the leader tape 141 is regarded as the actual starting position of the magnetic tape 130, that is, a physical beginning of tape (PBOT). The DA 142 is regarded as a region at which loading or unloading is performed. In this example, L+1 partitions 143-0 to 143-L are formed after the DA 142. The head position of the first partition 143-0 is regarded as a logical beginning of tape (LBOT), and the end point of the last partition 143-L is regarded as a physical end of tape (PEOT). Following the last partition 143-L, a leader tape 144 is formed. The end of the leader tape 144 is regarded as an end of media (EOM).

Each partition 143-i (i=0, 1, 2, ..., L) includes a system area 151, a data area 152, an end of data (EOD) 153, and an ODA 154. The backend of the EOD 153, which is the starting point of the ODA 154, is regarded as an end of partition (EOP). The EOP of the last partition is regarded as a logical end of tape (LEOT).

Usage history information of the magnetic tape 130 or the like is stored in the system area 151. Actual data is written in the data area 152. The EOD 153 indicates the end of the data area in that partition. The ODA 154 is regarded as a position at which loading or unloading is performed in the middle of the magnetic tape 130. The ODA 154 is not formed in the last partition 143-L (partition preceding the leader tape 144). In the ODA 154, positional information of the partition at which the ODA is located is written. By confirming the positional information, it is possible to confirm the position of the partition adjacent to the partition at the current position. The positional information is stored in the ID area A2 in the ODA 154, as shown in FIG. 6C.

Figure 13:
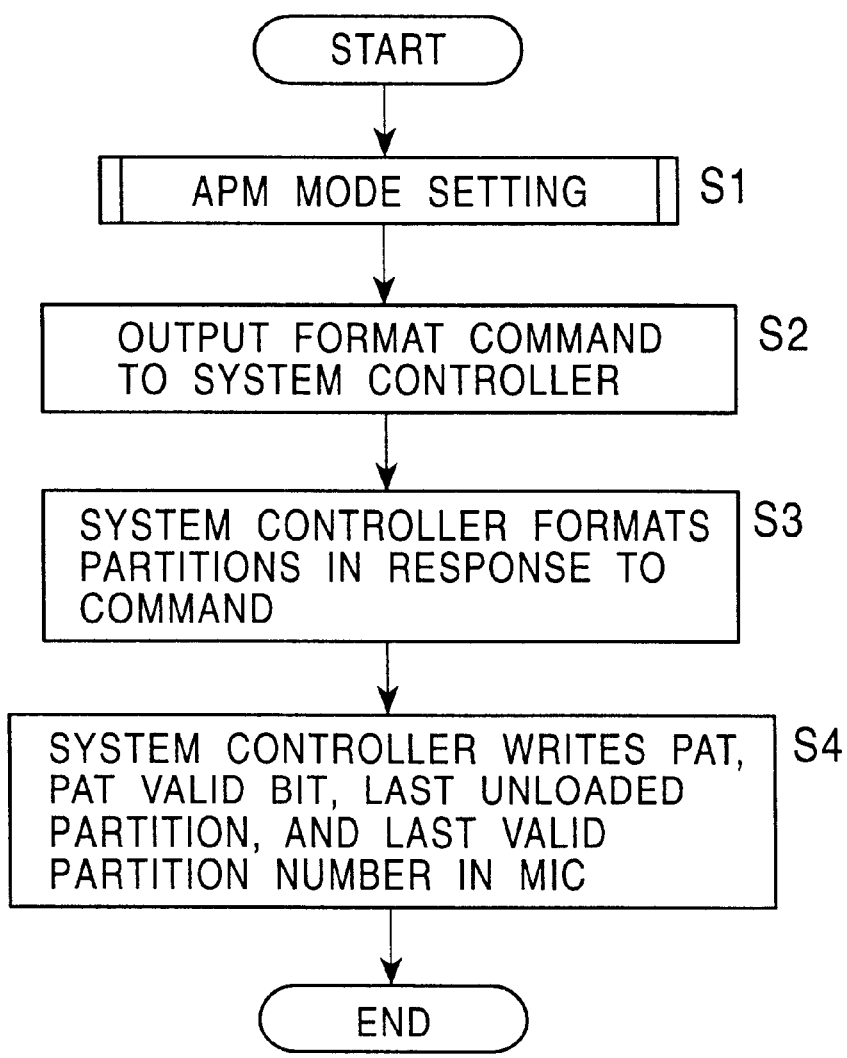
FIG. 13 is a flowchart showing a process of pre-formatting partitions by the tape streamer device shown in FIG. 3.

A partition can be created in advance by pre-formatting. Alternatively, a partition can be formed at any time by a process of adding a partition every time data is written. FIG. 13 is a flowchart showing a process of pre-formatting a partition.

In this example, in step S1, advanced partition management (APM) mode setting is performed. Details of setting the APM mode are illustrated by a flowchart shown in FIG. 14.

Figure 14:
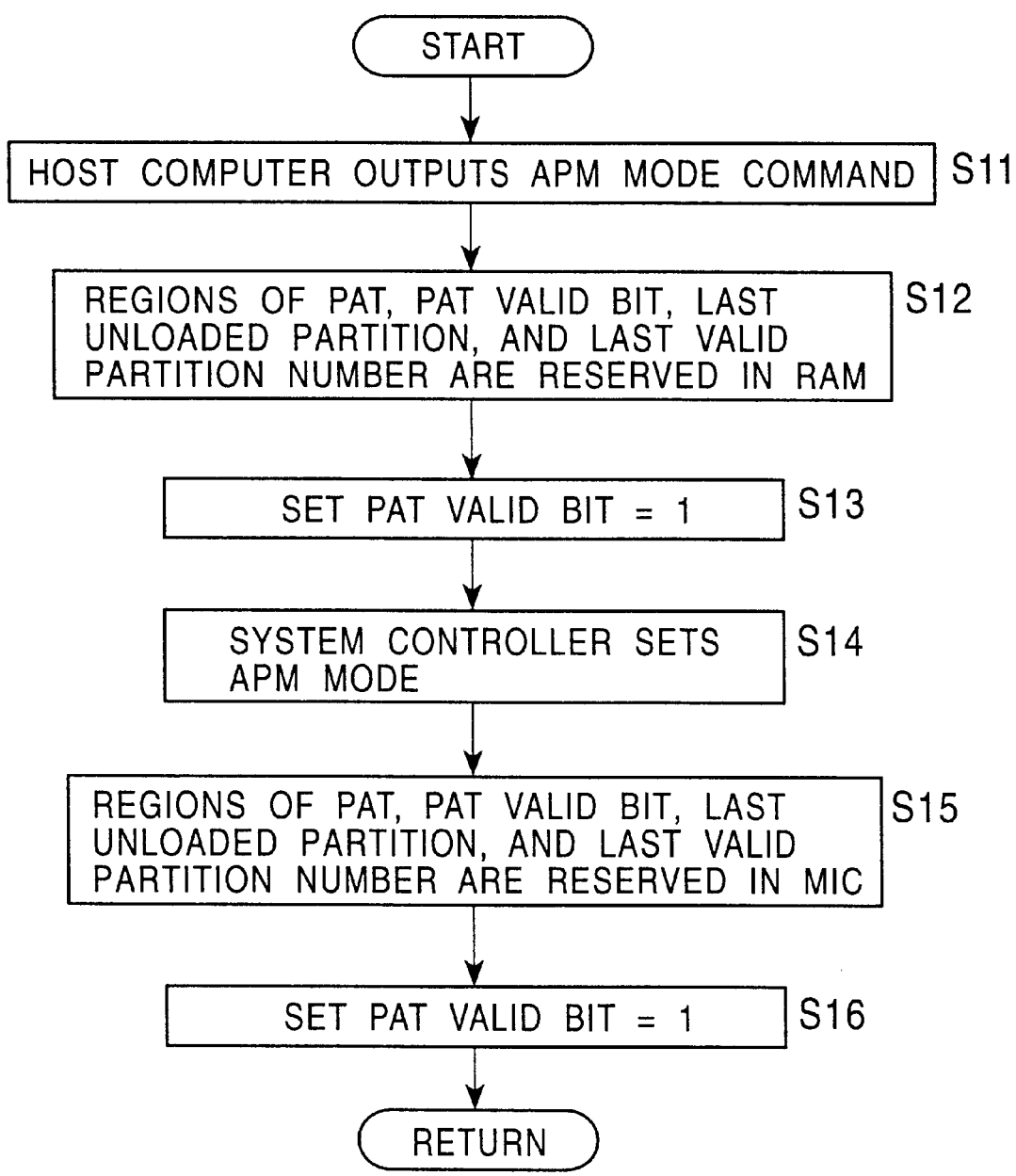
FIG. 14 is a flowchart showing details of advanced partition management (APM) mode setting performed in step S1 in FIG. 13.

Referring to FIG. 14, in step S11, the host computer 91 outputs an APM mode command. The APM mode command is a command for requiring the tape streamer device 21 to set the APM mode. This command is sent to the system controller 71 via the bus 81 and the interface controller 31. In step S12, the system controller 71 reserves regions of a partition access table (PAT), PAT valid bit, last unloaded partition, and last valid partition number. Referring to FIG. 15A, these regions correspond to regions (regions reserved in step S15) formed in the MIC 120 of the magnetic tape in which the APM mode is settable. The PAT is a table showing the number of record counts each indicating the number of data blocks (including the number of filemarks and the number of setmarks), the number of filemark counts each indicating the number of filemarks, and the number of setmark counts each indicating the number of setmarks per partition. The PAT valid bit is a bit (flag) indicating whether the magnetic tape is a tape in which the APM mode is settable. The last unloaded partition indicates a partition which is most recently unloaded. The last valid partition number indicates a number of the last valid partition formed in the magnetic tape 130.

In step S13, the system controller 71 sets the PAT valid bit to one. Accordingly, it is set that the magnetic tape 130 is a magnetic tape in the PAT mode.

In step S14, the system controller 71 sets the APM mode in response to the APM mode command from the host computer 91. In step S15, the system controller 71 gains access to the MIC 120 via the read/write controller 73 and reserves regions for writing data, which are similar to those reserved in the RAM 72 in step S12. In step S16, the system controller 71 sets the PAT valid bit among the regions to one.

Referring back to FIG. 13, as described above, when the APM mode setting is completed in step S1, in step S2, the host computer 91 outputs a FORMAT command to the system controller 71. In step S3, the system controller 71 pre-formats the partitions on the magnetic tape 130 as shown in FIG. 12 in response to the FORMAT command from the host computer 91. In step S4, the system controller 71 writes information concerning the partitions pre-formatted in step S3 in the PAT, the PAT valid bit, the last unloaded partition, and the last valid partition number in the MIC 120.

FIG. 16 shows an example of the PAT stored in the MIC 120 in this manner. As shown in FIG. 16, the record count, the filemark count, and the setmark count are written for each of the partition #0 to the partition #L (corresponding to the partition 143-0 to the partition 143-L in FIG. 12). In the example shown in FIG. 16, the value of the record count of the partition #0 is r(0), the value of the filemark count is f(0), the value of the setmark count is s(0).

Figure 17A:
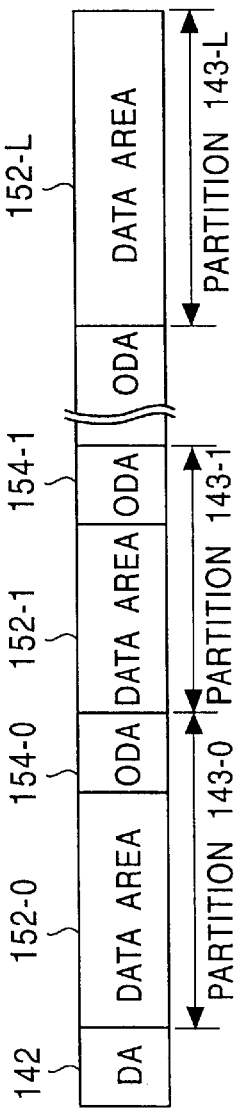
FIGS. 17A to 17C are illustrations of cumulative values of a record count.
Figure 17B:
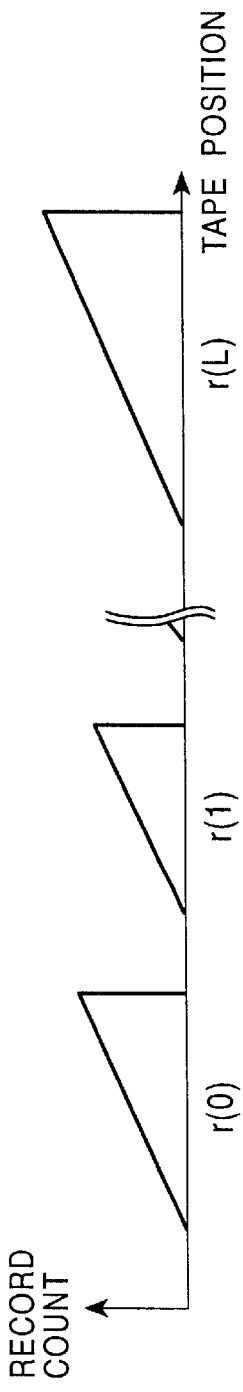

These count values are values in the corresponding partitions. All of these count values are zero immediately after pre-formatting. When data is actually written, the value of the record count by way of example among these values gradually increases as the tape position moves from the starting point to the end point, as shown in FIGS. 17A and 17B. For example, the value r(0) of the record count of a data area 152-0 in the partition 143-0 gradually increases from a smaller value to a larger value moving from the starting point of the data area 152-0 to the end point, as shown in FIG. 17A. The value r(1) of the record count of a data area 152-1 in the partition 143-1 gradually increases from a smaller value to a larger value from the starting point of the data area 152-1 to the end point, as shown in FIG. 17A.

FIG. 18 is a flowchart showing a process of forming a partition every time data is written.

In step S21, the APM mode setting is performed. The APM mode setting is similar to that described with reference to the flowchart shown in FIG. 14.

In step S22, the host computer 91 determines whether it is necessary to create a new partition. When the determination is affirmative, the host computer 91 outputs, in step S23, an APPEND PARTITION command to the system controller 71. In response to the APPEND PARTITION command from the host computer 91, the system controller 71 additionally creates a new partition in step S24. In step S25, the system controller 71 writes in the newly created partition. In step S26, the system controller 71 updates predetermined data among the PAT, the PAT valid bit, the last unloaded partition, and the last valid partition number in the MIC 120.

When it is determined in step S22 that it is not necessary to create a new partition, processing in steps S23 and S24 is skipped. Hence, processing in step S25 and step S26 is performed in the already-created partitions.

Figure 19:
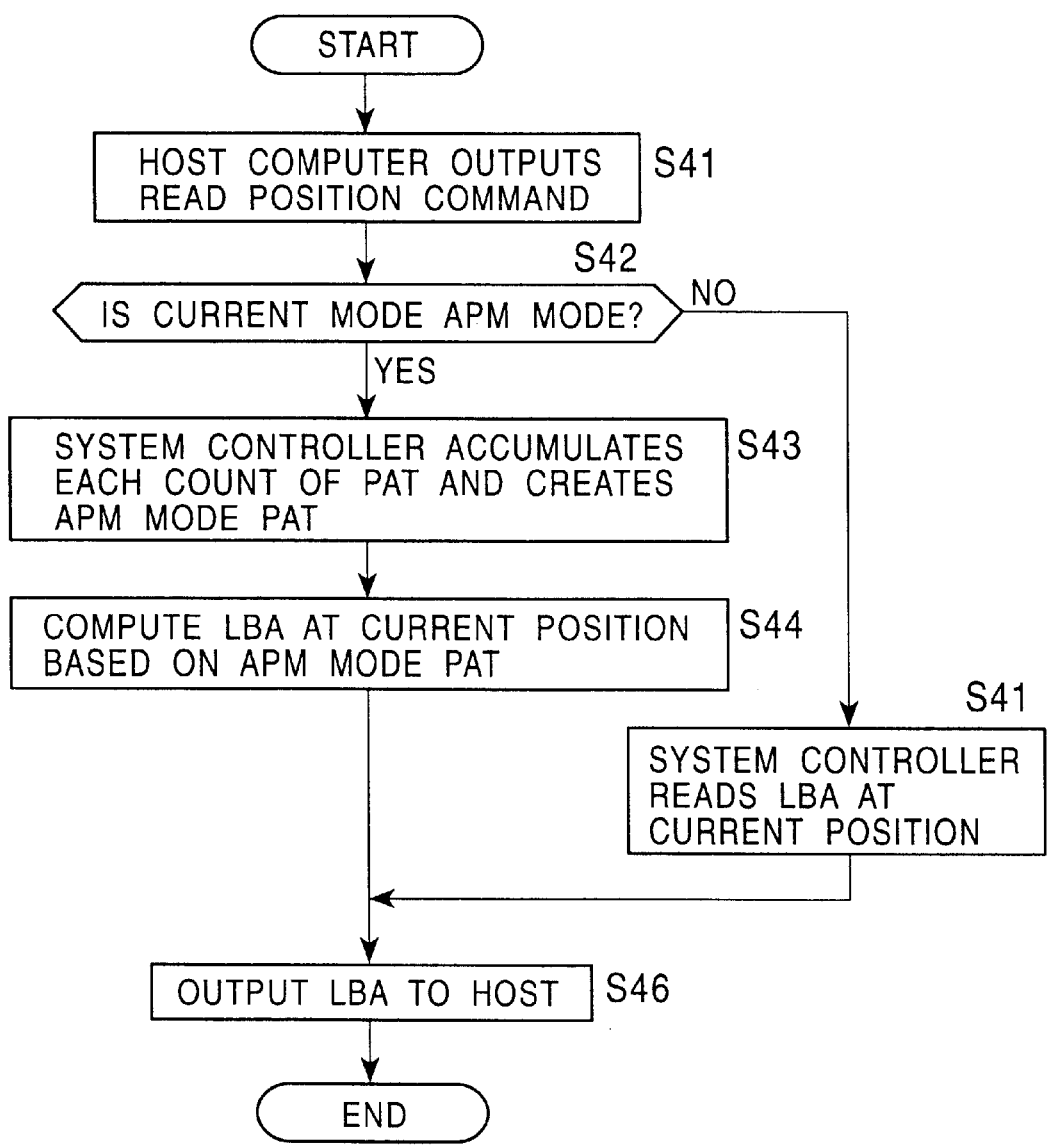
FIG. 19 is a flowchart showing a process of obtaining a count value of LBA by the tape streamer device shown in FIG. 3.

FIG. 19 is a flowchart showing a process of obtaining a current value of an LBA by the host computer 91. In step S41, the host computer 91 outputs a READ POSITION command to the system controller 71. In response to the command, the system controller 71 determines in step S42 whether the current mode is the APM mode. When the determination is affirmative, the system controller 71 accumulates, in step S43, each of the count values (counts) of the PAT stored in the RAM 72 and creates an APM mode PAT.

FIG. 20 shows an example of the APM mode PAT as created in this manner. Values R(n), F(n), and S(n) shown in FIG. 20 indicate cumulative values of the count values from the partition #0 to the partition #n, which are obtained by the following equations:

$$R(n) = r(0) + r(1) + \ldots + r(n)$$

$$F(n) = f(0) + f(1) + \ldots + f(n)$$

$$S(n) = s(0) + s(1) + \ldots + s(n)$$

Figure 17C:
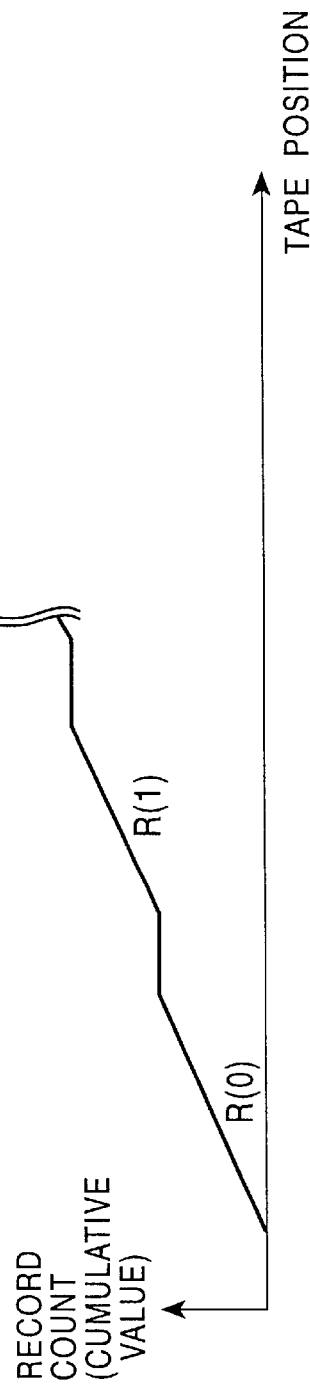

For example, the cumulative value of the record count is as shown in FIG. 17C. In step S44, the system controller 71 computes the LBA at the current position based on the APM mode PAT created in step S43. Specifically, the LBA of the current partition is expressed by the following equations:

$$\text{record count} = i$$

$$\text{filemark count} = j$$

$$\text{setmark count} = k$$

When the partition number of the current partition is N, the LBA at the current position is expressed by the following equations:

$$\text{record count} = R(N-1) + i$$

$$\text{filemark count} = F(N-1) + j$$

$$\text{setmark count} = S(N-1) + k$$

In step S46, the system controller 71 outputs the LBA computed in step S44 as described above to the host computer 91.

In contrast, in step S42, when it is determined that the current mode is not the APM mode, the system controller 71 reads the LBA at the current position in step S45. In step S46, the system controller 71 outputs that value to the host computer 91. Specifically, in this case, the value of the LBA in the partition expressed by the following equations is output to the host computer 91 as it is:

$$\text{record count} = i$$

$$\text{filemark count} = j$$

$$\text{setmark count} = k$$

Therefore, in this case, the host computer 91 has difficulty in accurately controlling the position of the magnetic tape 130 except when the magnetic tape 130 is positioned at the head partition (number 0) 143-0.

Figure 21:
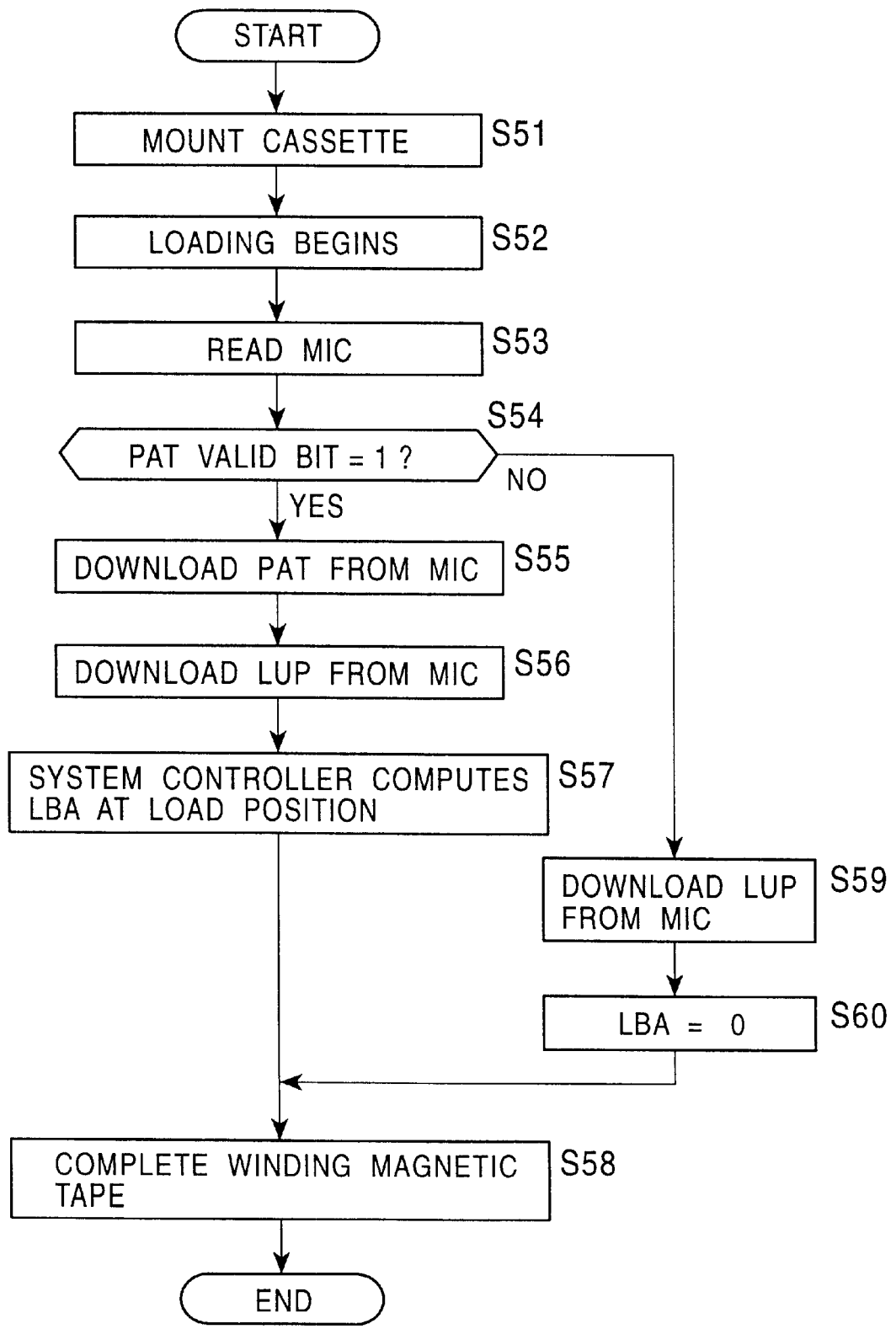
FIG. 21 is a flowchart showing a loading process by the tape streamer device shown in FIG. 3.

Referring to a flowchart shown in FIG. 21, a loading process is described.

In step S51, a user mounts the tape cassette 100 in the tape streamer device 21. In step S52, the system controller 71 extracts the magnetic tape 130 stored in the tape cassette 100 and starts loading by winding the magnetic tape 130 on to the rotating drum 51. In step S53, the system controller 71 reads data stored in the MIC 120 via the read/write controller 73. In step S54, the system controller 71 determines whether the PAT valid bit in the data read in step S53 is one, that is, whether the placed magnetic tape 130 is a magnetic tape conforming to the APM mode. When the determination is affirmative, in step S55, the system controller 71 reads the PAT stored in the MIC 120 and downloads the PAT to the RAM 72. In step S56, the system controller 71 downloads a last unloaded partition (LUP) from the MIC 120 to the RAM 72.

In step S57, the system controller 71 computes the LBA at the load position. When the value of the LUP read in step S56 is N, the LBA at the load position can be computed as follows:

$$\text{record count} = R(N-1)$$

$$\text{filemark count} = F(N-1)$$

$$\text{setmark count} = S(N-1)$$

In step S58, the system controller 71 completes winding of the magnetic tape 130 on to the drum 51.

In step S54, when it is determined that the PAT valid bit is not one (that it is zero), it is determined that the magnetic tape does not conform to the APM mode. In this case, only the LUP is recorded in the MIC 120, as shown in FIG. 15B. In step S59, the system controller 71 downloads the LUP, and in step S60, sets the LBA to zero. Subsequently, processing in step S58 is performed.

Figure 22:
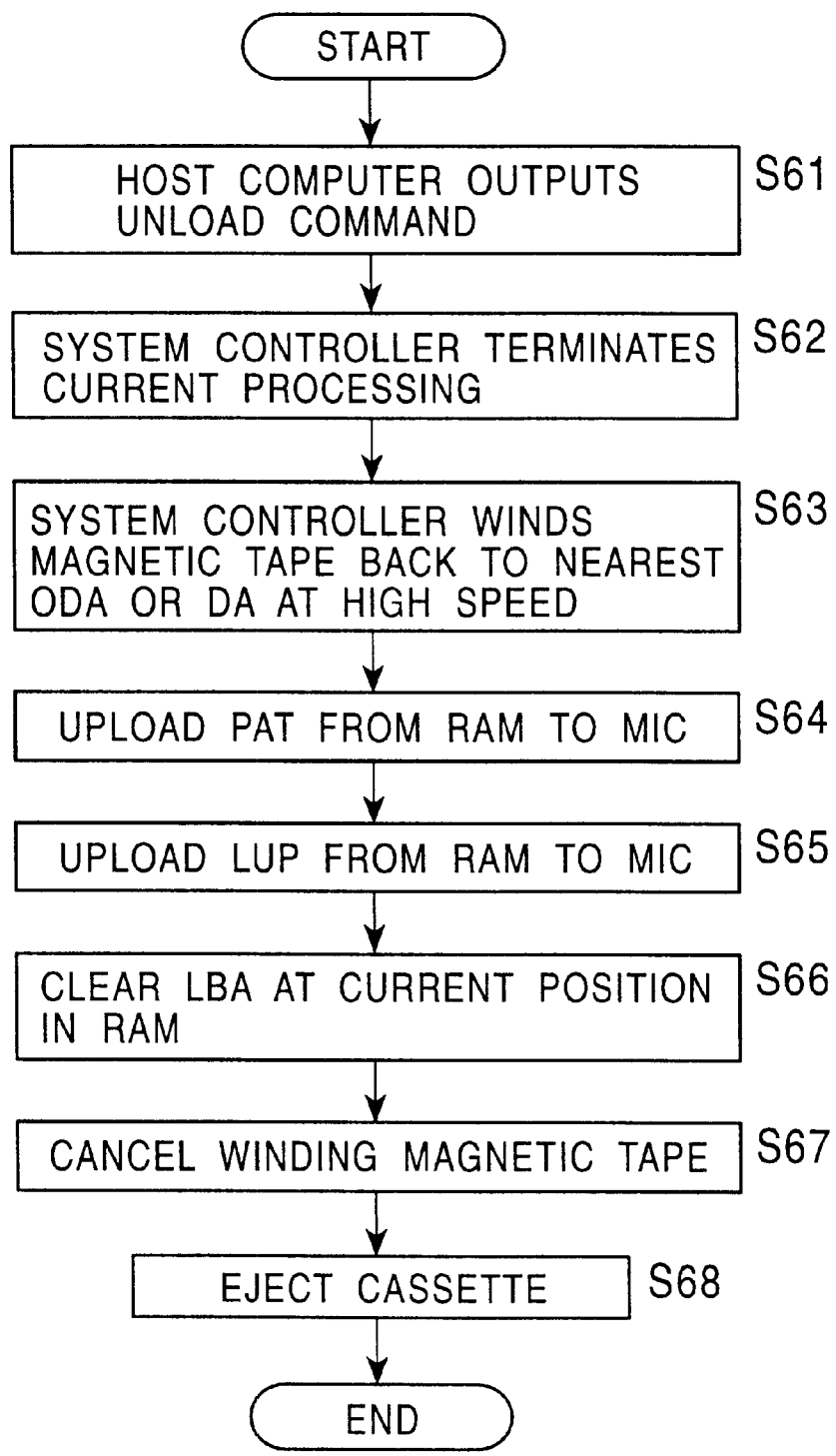
FIG. 22 is a flowchart showing an unloading process by the tape streamer device shown in FIG. 3.

Referring now to a flowchart shown in FIG. 22, an unloading process is described. In step S61, the host computer 91 outputs an UNLOAD command to the system controller 71. In step S62, the system controller 71 terminates the current processing in response to the UNLOAD command. In step S63, the system controller 71 winds the magnetic tape 130 in the reverse direction to the nearest ODA or DA at high speed. In step S64, the system controller 71 uploads the PAT from the RAM 72 to the MIC 120. In step S65, the system controller 71 uploads the LUP stored in the RAM 72 to the MIC 120. In step S66, the system controller 71 clears the LBA at the current position stored in the RAM 72.

In step S67, the system controller 71 cancels winding of the magnetic tape 130 on to the rotating drum 51, thus unloading the magnetic tape 130. In step S68, the system controller 71 ejects the tape cassette 100. Accordingly, when unloading is performed at the ODA, loading is also performed at the ODA.

Figure 23:
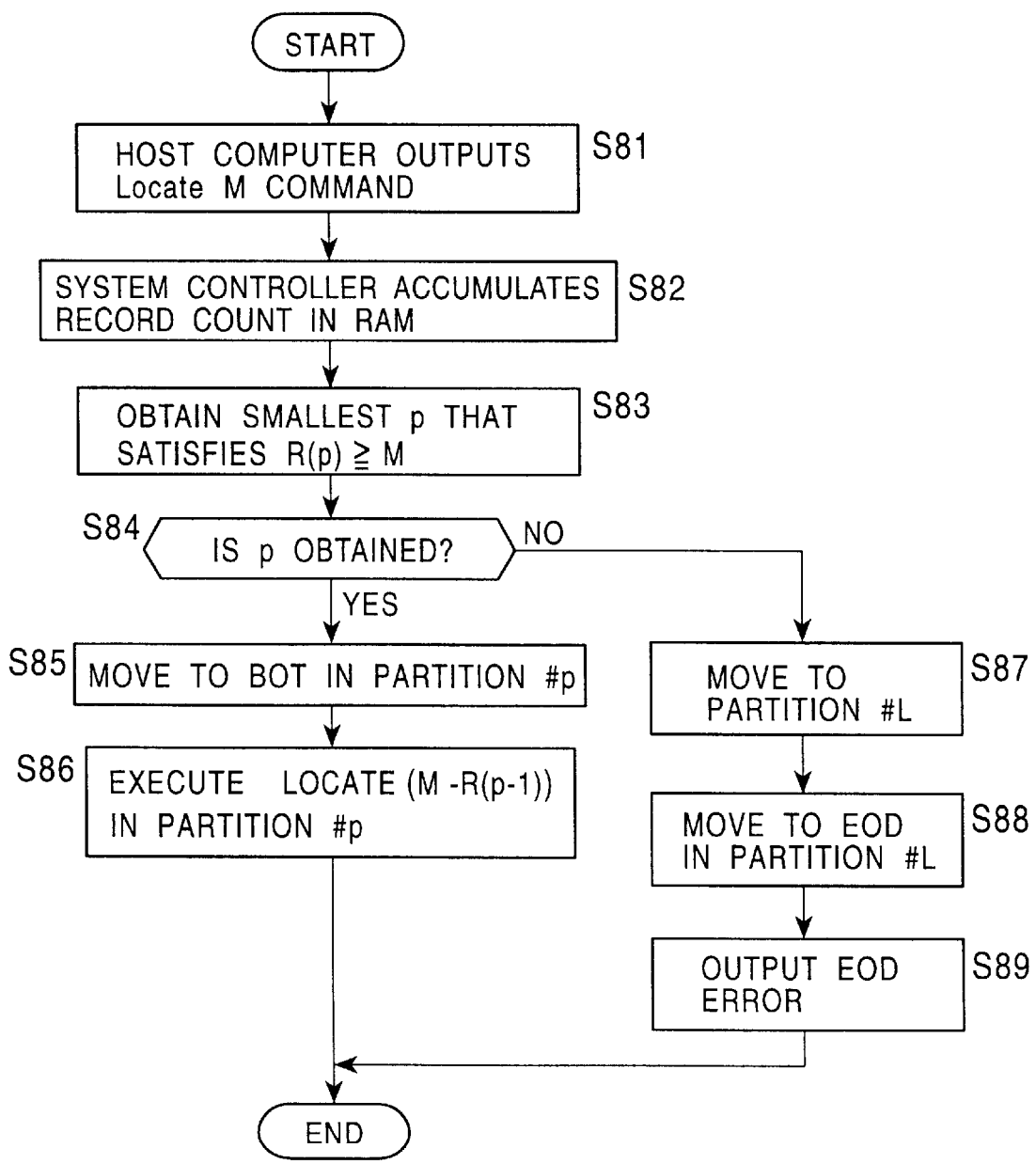
FIG. 23 is a flowchart showing a process of processing a Locate M command by the tape streamer device shown in FIG. 3.

FIG. 23 is a flowchart showing a process of processing a Locate M command. Locate M command is a command for moving the magnetic tape to the position at which the record count=M. When the host computer 91 outputs the Locate M command in step S81, the system controller 71 accumulates, in step S82, the record count stored in the RAM 72 in response to the Locate M command. For example, when the record count is stored in the RAM 72 as shown in FIG. 24A, an arithmetic operation for accumulating the value of the record count in each partition is executed, as shown in FIG. 24B.

In step S83, the system controller 71 obtains the smallest p for which the cumulative value R(p) (p=0, 1, 2, ..., L) is equal to or greater than M. In step S84, the system controller 71 determines whether the value p that satisfies the condition in step S83 is obtained. When p is obtained, the system controller 71 moves, in step S85, the magnetic tape 130 to the BOT (LBOT) of the partition #p. In step S86, the system controller 71 executes the Locate (M−R(p−1)) in the partition #p.

When it is determined in step S84 that the value p satisfying the condition specified in step S83 is not obtained, the system controller 71 moves, in step S87, the magnetic tape 130 to the partition #L (last partition). In step S88, the system controller 71 moves the magnetic tape 130 to the EOD of the partition #L. In step S89, the system controller 71 outputs to the host computer 91 an EOD error indicating that the address of a destination is not found preceding the EOD.

FIG. 25A illustrates a state in which the value of the record count in each partition is stored as ten. When the Locate 35 (M=35) command is output, in step S82, the cumulative value of the values in the partitions increasing by ten is computed, as shown in FIG. 25B. It is thus understood that the APM mode LBA=35 is in a command block in the partition #3. In step S85, the system controller 71 moves to the partition #3. In step S86, the system controller 71 executes the Locate 5 (=35−30) in the partition #3. Specifically, the magnetic tape is further moved in the partition #3 to a position at which the record count=5.

Figure 26:
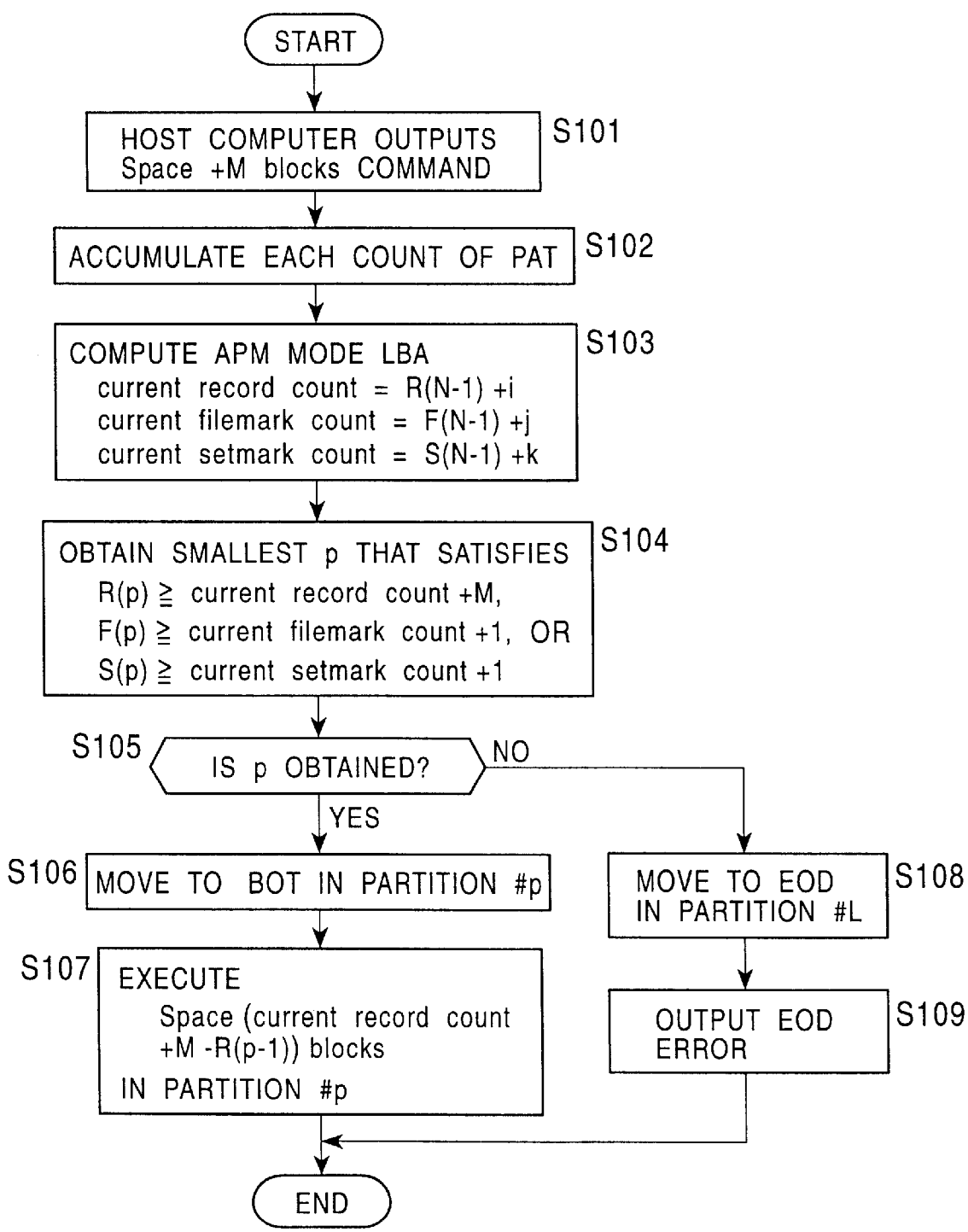
FIG. 26 is a flowchart showing a process of processing a Space +M blocks command by the tape streamer device shown in FIG. 3.

FIG. 26 is a flowchart showing a process of processing a Space +M blocks command. Space +M blocks command is a command for moving the magnetic tape +M blocks from the current position. When the filemark or the setmark is detected, the magnetic tape stops there.

When the host computer 91 outputs the Space +M command in step S101, the system controller 71 accumulates each count in the PAT in step S102. Specifically, as described above, the APM mode PAT as shown in FIG. 20 is computed based on the PAT as shown in FIG. 16.

In step S103, the system controller 71 computes the APM mode LBA using the following equations:

$$\text{current record count} = R(N-1) + i$$

$$\text{current filemark count} = F(N-1) + j$$

$$\text{current setmark count} = S(N-1) + k$$

The value N indicates a number of the current partition, and the values i, j, and k indicate the record count, the filemark count, and the setmark count in each partition, respectively.

In step S104, the system controller 71 obtains the smallest p that satisfies the conditions expressed by the following three expressions:

$$R(p) \geq \text{current record count} + M \text{ or}$$

$$F(p) \geq \text{current filemark count} + 1 \text{ or}$$

$$S(p) \geq \text{current setmark count} + 1$$

In step S105, the system controller 71 determines whether the value p that satisfies the conditions in step S104 is obtained. If p is obtained, the process proceeds to step S106, and the system controller 71 moves the magnetic tape 130 to the BOT in the partition #p. In step S107, the system controller 71 executes the Space (current record count +M−R(p−1)) blocks command. Specifically, the magnetic tape is further moved in the partition #p by (M−R(p−1)) blocks.

When the smallest p satisfying the condition specified in step S104 is not obtained in step S105, the system controller 71 moves, in step S108, the magnetic tape 130 to the EOD in the partition #L (last). In step S109, the system controller 71 outputs the EOD error to the host computer 91.

For example, when the PAT is in a state as shown in FIG. 27A in which the record count is ten in each partition, the filemark count is one in the partitions #2, #4, and #6, and the setmark count is one in the partition #4, the APM mode PAT is created in step S102, as shown in FIG. 27B in which the record count increases from 10, 20, 30, . . . , 70 every partition, the filemark count is 0, 0, 1, 1, 2, 2, 3, and the setmark count is 0, 0, 0, 0, 1, 1, 1. Assuming that the current position is at the following position, counting from the head of the partition #2:

$$\text{record count} = 3$$

$$\text{filemark count} = 1$$

$$\text{setmark count} = 0$$

then, the APM mode LBA can be obtained in step S103 as:

$$\text{current record count} = R(1) + 3 = 20 + 3 = 23$$

$$\text{current filemark count} = F(1) + 1 = 0 + 1 = 1$$

$$\text{current setmark count} = S(1) + 0 = 0 + 0 = 0$$

In such a state, when the Space 10 blocks command is processed, the conditions in step S104 are expressed by the following expressions:

$$\text{record count of } R(p) \geq 23 + 10$$

or $$\text{filemark count of } F(p) \geq 1 + 1$$

or $$\text{setmark count of } S(p) \geq 0 + 1$$

Since the smallest p satisfying the condition is three, the magnetic tape 130 is moved to the partition #3 in step S106. In step S107, the Space (23+10−30) blocks command is executed.

In contrast, when the Space 40 blocks command is processed, the conditions in step S104 are expressed by the following expressions:

$$\text{record count of } R(p) \geq 23 + 40$$

or $$\text{filemark count of } F(p) \geq 1 + 1$$

or $$\text{setmark count of } S(p) \geq 0 + 1$$

Since the smallest p satisfying the condition is four (hitting the filemark in the partition #4), movement to the partition #4 is performed in step S106. In step S107, the Space (23+40−30) blocks=Space 33 blocks command is executed.

Figure 28:
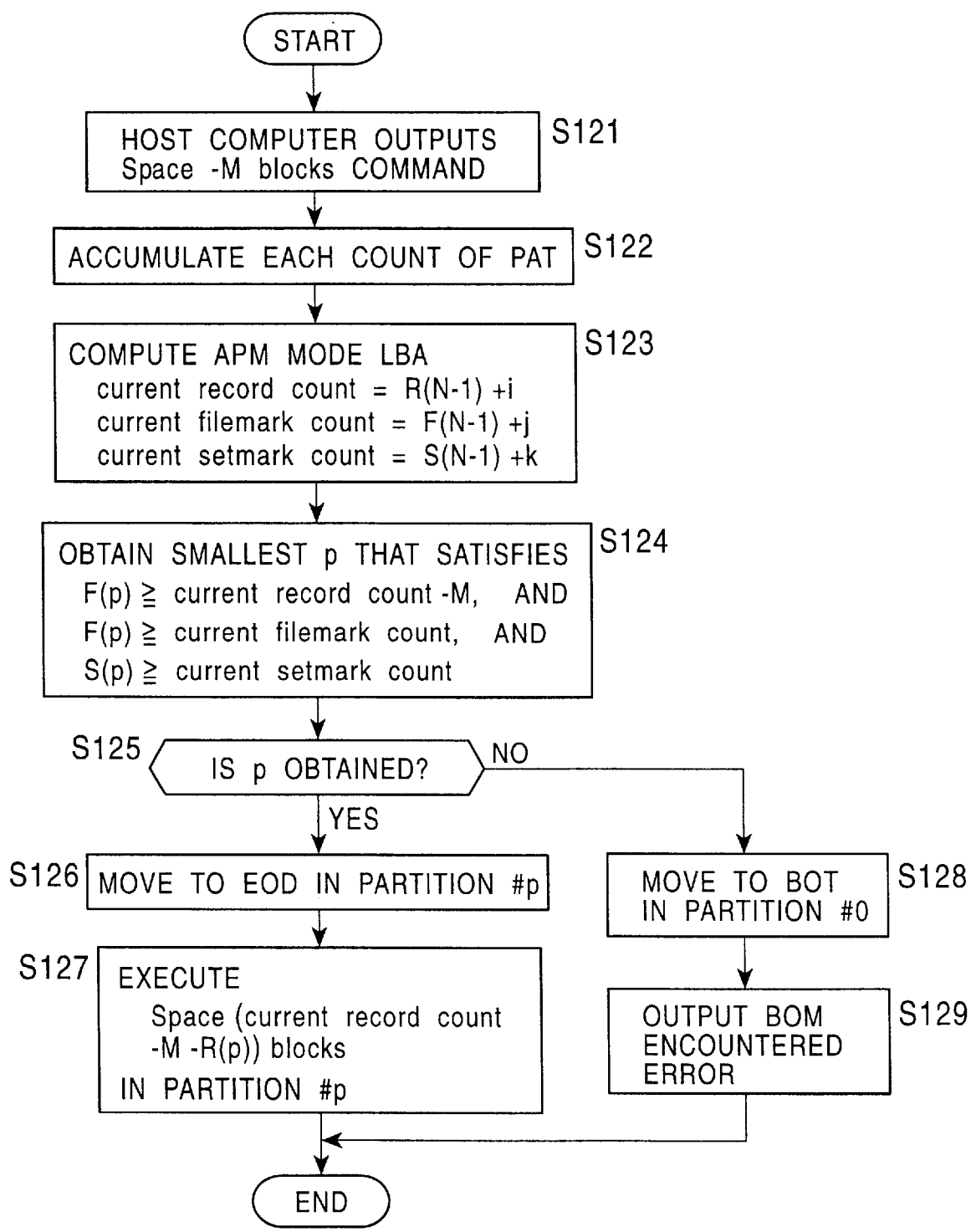
FIG. 28 is a flowchart showing a process of processing a Space −M blocks command by the tape streamer device shown in FIG. 3.

Referring to a flowchart shown in FIG. 28, a process performed when a Space −M blocks command is output by the host computer 91 is described. When the host computer outputs the Space −M blocks command in step S121, the system controller computes in step S122 the APM mode PAT as shown in FIG. 27B based on the PAT as shown in FIG. 27A. In step S123, the system controller 71 computes the APM mode LBA using the following equations:

current record count=$R(N-1)+i$ current filemark count=$F(N-1)+j$ current setmark count=$S(N-1)+k$ In step S124, the system controller 71 obtains the smallest p that satisfies the following expressions:

$R(p) \geq$ current record count $-M$ and $F(p) \geq$ current filemark count and $S(p) \geq$ current setmark count In step S125, the system controller 71 determines whether the smallest p that satisfies the conditions in step S124 is obtained. If p is obtained, in step S126, the magnetic tape 130 is moved to the EOD in the partition #p. In step S127, the system controller 71 executes the Space (current record count +M−R(p)) blocks command.

When it is determined in step S125 that p satisfying the conditions in step S124 is not obtained, in step S128, the system controller 71 moves the magnetic tape 130 to the BOT in the partition #0. In step S129, the system controller 71 outputs to the host computer 91 a BOM encountered error indicating that the destination address did not exist in the course of winding.

When the PAT have values as shown in FIG. 27A, the process computes, in step S122, the APM mode PAT as shown in FIG. 27B. When the current position is expressed by the following equations, counting from the head of the partition #6:

record count=3 filemark count=0 setmark count=0 then, the process computes, in step S123, the AMP mode LBA as expressed by the following equations:

current record count=$R(5)+3=60+3=63$ current filemark count=$F(5)+0=2+0=2$ current setmark count=$S(5)+0=1+0=1$ In such a case, for example, when the Space −10 blocks command is processed, the conditions in step S124 are as follows:

record count of $R(p) \geq 63-10=53$ and filemark count of $F(p) \geq 2$ and setmark count of $S(p) \geq 1$ The value of the smallest p satisfying these conditions is five. As a result, in step S126, the magnetic tape 130 is moved to the EOD in the partition #5. In addition, the Space (63−10−60) blocks=Space −7 blocks command is executed.

When processing the Space −40 blocks command, the conditions in step S124 are as follows:

record count of $R(p) \geq 63-40=23$ filemark count of $F(p) \geq 2$ and setmark count of $S(p) \geq 1$ The smallest p satisfying these conditions is four (hitting the filemark in the partition #4). In step S126, movement to the EOD in the partition #4 is performed. In step S127, the Space (63−40−50) blocks=Space −27 blocks command is executed.

Figure 29:
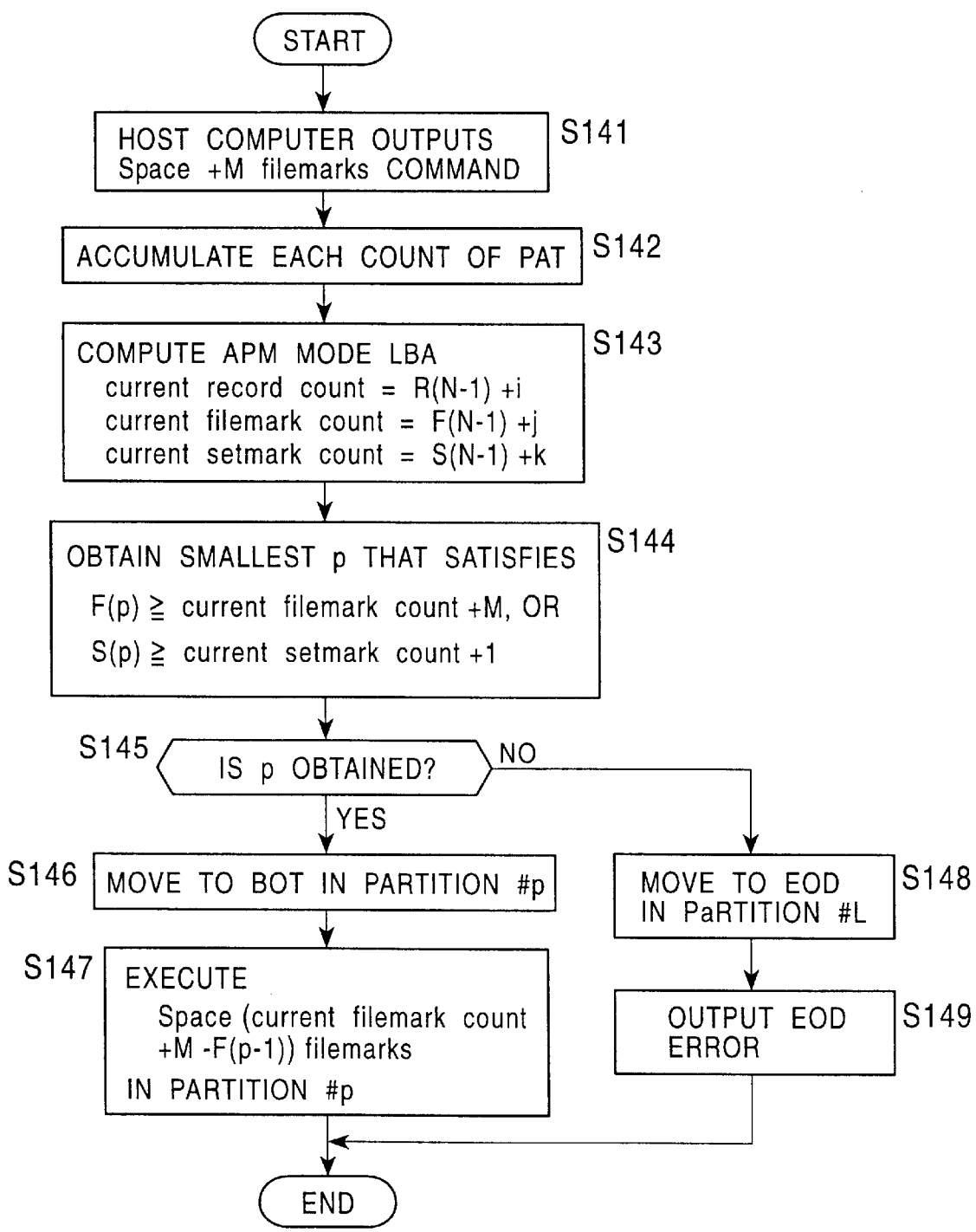
FIG. 29 is a flowchart showing a process of processing a Space +M filemarks command by the tape streamer device shown in FIG. 3.

Referring to a flowchart shown in FIG. 29, an example of a process of processing a Space +M filemarks command is described. Space +M filemarks command is a command for forwarding the magnetic tape by +M filemarks. When the setmark is hit, the magnetic tape stops.

When the host computer 91 outputs the Space +M filemarks command in step S141, the system controller 71 generates in step S142 the APM mode PAT as shown in FIG. 27B based on the PAT as shown in FIG. 27A. In step S143, the system controller 71 computes the APM mode LBA (however, arithmetic on the current record count can be omitted). This processing is similar to that in step S103 in FIG. 26 or in step S123 in FIG. 28.

In step S144, the system controller 71 obtains the smallest p that satisfies the following conditions:

$F(p) \geq$ current filemark count $+M$ or $S(p) \geq$ current setmark count $+1$ In step S145, the system controller 71 determines whether p satisfying the conditions specified in step S144 is obtained. If p is obtained, in step S146, the magnetic tape is moved to the BOT in the partition #p. In step S147, the Space (current filemark count +M−F(p−1)) filemarks is processed in the partition #p.

When the value p satisfying the conditions specified in step S144 is not obtained in step S145, in step S148, the system controller 71 moves the magnetic tape to the EOD in the partition #L (last). In step S149, the system controller 71 outputs the EOD error to the host computer 91.

For example, when the APM mode PAT as shown in FIG. 27B is obtained based on the PAT as shown in FIG. 27A in step S142, and when the current position is expressed by the following equations, counting from the head of the partition #2:

record count=3 filemark count=1 setmark count=0 then, the APM mode LBA is computed in step S143 using the following equations:

current record count=$R(1)+3=20+3=23$ current filemark count=$F(1)+1=0+1=1$ current setmark count=$S(1)+0=0+0=0$ When the command to be processed is the Space 1 filemark command, the conditions in step S144 are expressed by:

filemark count of $F(p) \geq 1+1$ or $$\text{setmark count of } S(p) \geq 0+1$$

The smallest p satisfying the conditions is four. Hence, in step S146, movement to the BOT in the partition #4 is performed. In step S146, the Space (1+1−1) filemarks command is executed in the partition #4.

When executing the Space 2 filemarks command, the conditions in step S144 are expressed by:

$$\text{filemark count of } F(p) \geq 1+2$$

or $$\text{setmark count of } S(p) \geq 0+1$$

The smallest p satisfying the conditions is four (hitting the setmark in the partition #4). In step S146, movement to the BOT in the partition #4 is performed. In step S147, the Space (1+2−1) filemarks command is executed in the partition #4.

Figure 30:
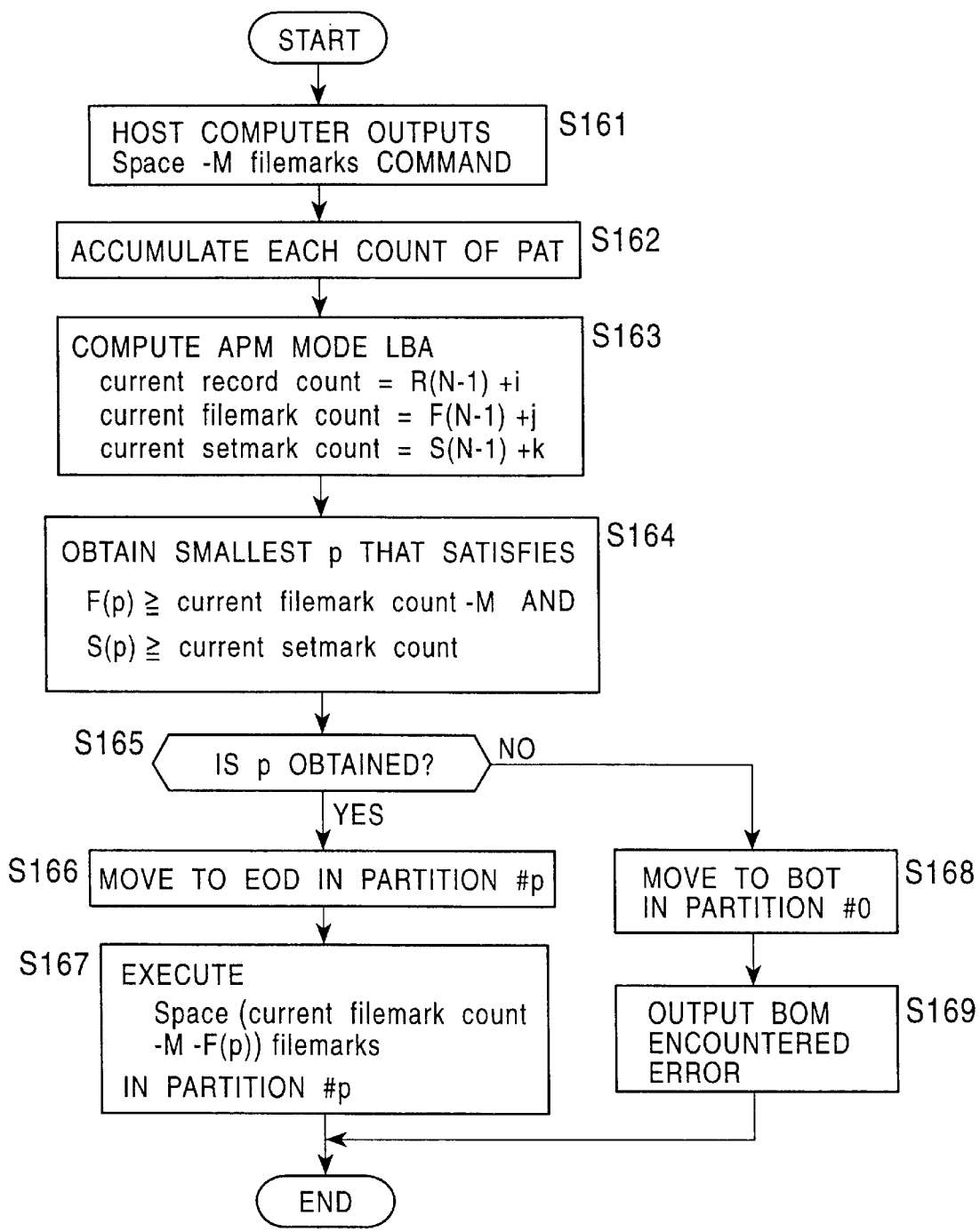
FIG. 30 is a flowchart showing a process of processing a Space −M filemarks command by the tape streamer device shown in FIG. 3.

FIG. 30 shows a flowchart showing an example of processing a Space −M filemarks command. The basic processing is similar to that shown in FIG. 29. In steps S161, S164, and S167, the value −M is used instead of the value +M used in steps S141, S144, and S147. In step S147, the Space (current filemark count +M−F(p−1)) filemarks command is executed, whereas in step S167 the Space (current filemark count −M−F(p)) filemarks is executed.

Referring to FIG. 29, subsequent to moving to the EOD in the partition #L in steps S148 and S149, the EOD error is output in step S150. Referring to FIG. 30, subsequent to moving to the BOT in the partition #0 in step S168, the BOM encountered error is output in step S169. The rest of the processing is the same as that in FIG. 29.

In step S162, the APM mode PAT as shown in FIG. 27B is generated based on the PAT as shown in FIG. 27A. When the current position is expressed by the following equations, counting from the head of the partition #6:

$$\text{record count} = 3$$

$$\text{filemark count} = 0$$

$$\text{setmark count} = 0$$

then, the APM mode LBA is obtained in step S163 as follows:

$$\text{current record count} = R(5)+3=60+3=63$$

$$\text{current filemark count} = F(5)+0=2+0=2$$

$$\text{current setmark count} = S(5)+0=1+0=1$$

When processing the Space −1 filemark command, the conditions in step S164 are expressed by:

$$\text{filemark count of } F(p) \geq 2-1$$

and $$\text{setmark count of } S(p) \geq 1$$

Since the smallest p satisfying these conditions is four, movement to the EOD in the partition #4 is performed in step S166. In step S167, the Space (2−1−2) filemarks processing is performed.

When the command to be processed is, for example, the Space −2 filemarks command, the conditions in step S164 are expressed by:

$$\text{filemark count of } F(p) \geq 2-2=0$$

and $$\text{setmark count of } S(p) \geq 1$$

The smallest p satisfying these conditions is four (the setmark in the partition #4 may be hit or may not be hit, and it is impossible to discriminate between the two cases). In step S166, movement to the EOD in the partition #4 is performed. In step S167, the Space (2−2−2) filemarks processing is performed. Accordingly, there are two cases in which the processing ends well (no error arises) and an setmark encountered error arises.

Figure 31:
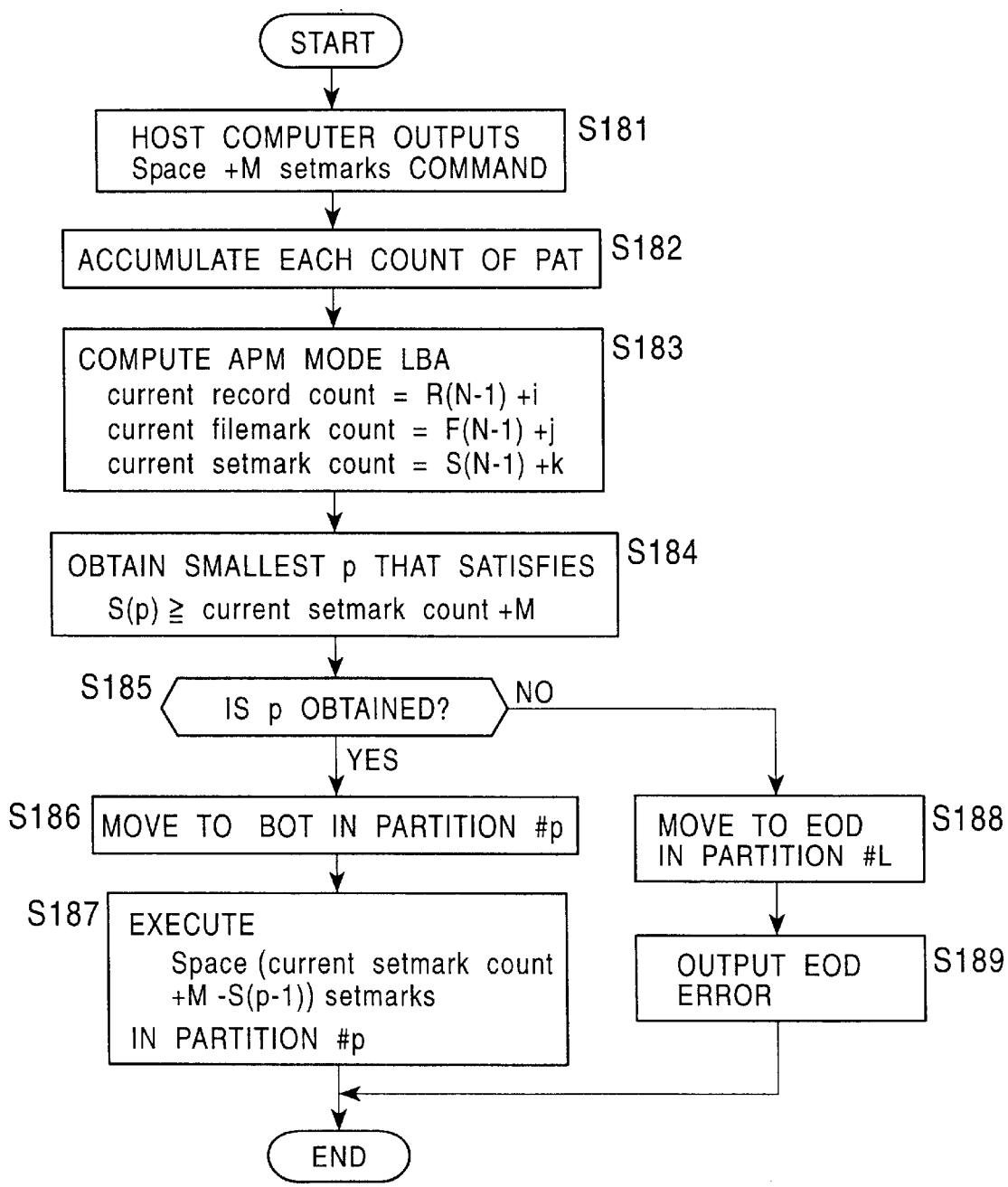
FIG. 31 is a flowchart showing a process of processing a Space +M setmarks command by the tape streamer device shown in FIG. 3.

FIG. 31 is a flowchart showing a process of processing a Space +M setmarks command. Space +M setmarks command is a command for forwarding the magnetic tape +M setmarks. The processing in FIG. 31 is basically the same as that in FIG. 26 for processing the Space +M blocks command. The command output in step S101 in FIG. 26 is the Space +M blocks command, whereas a command output in step S181 in FIG. 31 is the Space M setmarks command. In step S104 in FIG. 26, three conditional expressions are specified. In contrast, in step S184 in FIG. 31, only a conditional expression shown below is specified:

$$S(p) \geq \text{current setmark count} + M$$

In step S107 in FIG. 26, the Space (current record count +−M−R(p−1)) blocks command is executed. In contrast, in step S187 in FIG. 31, the Space (current setmark count +M−S(p−1)) setmarks command is executed. The rest of the processing is similar to that in FIG. 26.

Figure 32:
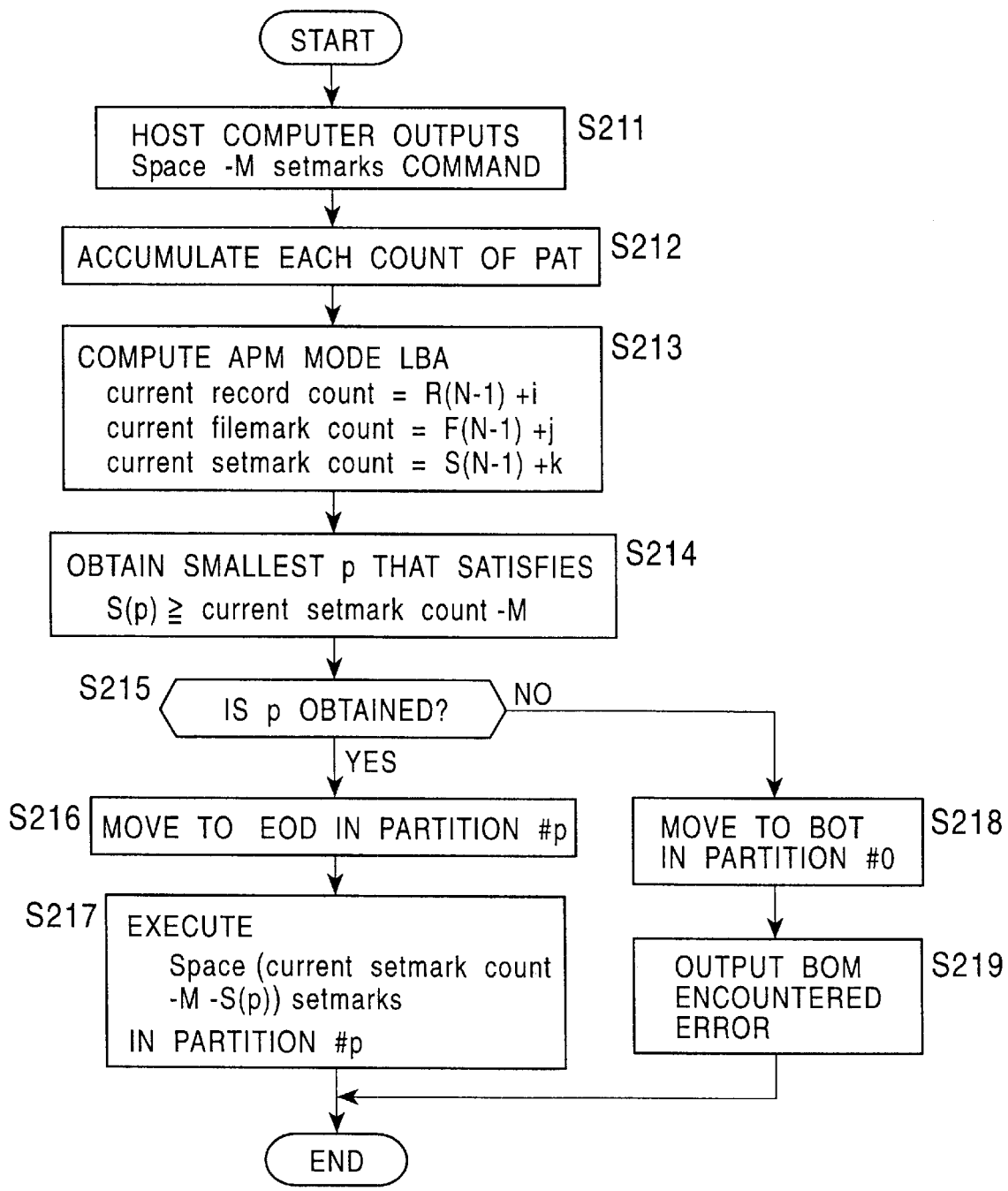
FIG. 32 is a flowchart showing a process of processing a Space −M setmarks command by the tape streamer device shown in FIG. 3.

FIG. 32 is a flowchart showing a process of processing a Space −M setmarks command. The processing is basically the same as that shown in FIG. 28 for processing the Space −M blocks command. The command output in step S121 in FIG. 28 is the Space −M blocks command, whereas a command output in step S211 in FIG. 32 is the Space −M setmarks command. In step S124 in FIG. 28, the conditions for the three values R(p), F(p), and S(p) are specified. In step S214 in FIG. 32, a condition for only S(p) is specified as:

$$S(p) \geq \text{current setmark count} -M$$

In step S127 in FIG. 28, the Space (current record count −M−R(p)) blocks command is executed. In contrast, in step S217 in FIG. 32, the Space (current setmark count −M−S(p)) setmarks command is executed. The rest of the processing is similar to that in FIG. 28.

Figure 33:
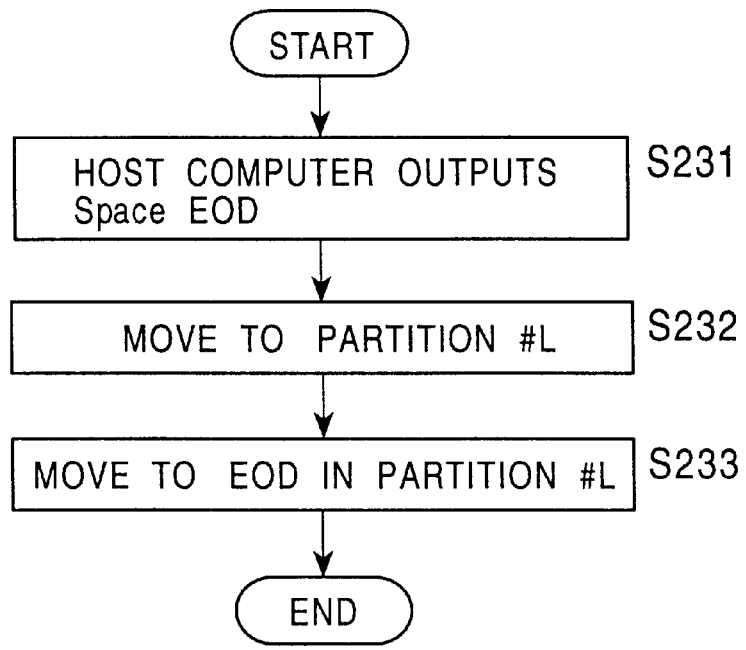
FIG. 33 is a flowchart showing a process of processing a Space EOD command by the tape streamer device shown in FIG. 3.

FIG. 33 shows an example of processing a Space EOD command. Space EOD command is a command for forwarding the magnetic tape to the EOD.

In step S231, the host computer 91 outputs the Space EOD command to the system controller 71. In step S232, the system controller 71 moves the magnetic tape 130 to the partition #L (last) in response to the command from the host computer 91. In step S233, the system controller 71 moves the magnetic tape 130 to the EOD in the partition #L.

Figure 34:
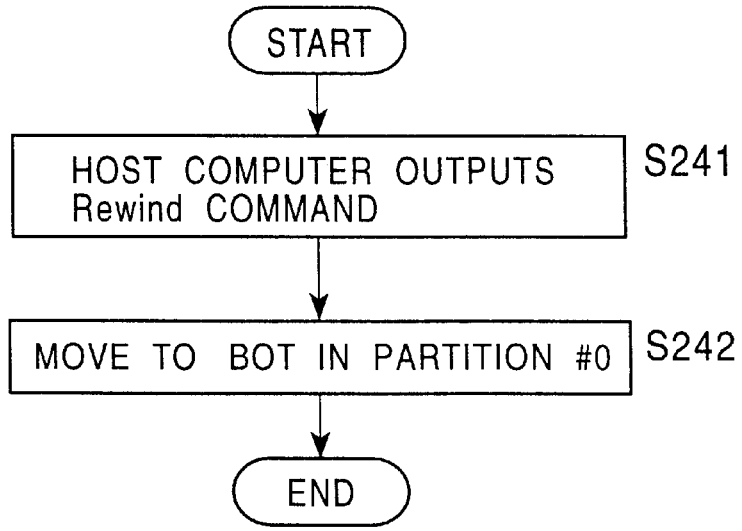
FIG. 34 is a flowchart showing a process of processing a Rewind command by the tape streamer device shown in FIG. 3.

FIG. 34 is a flowchart showing a process of processing a Rewind command. Rewind command is a command for moving the magnetic tape to the BOT.

When the host computer outputs the Rewind command in step S241, the system controller 71 moves the magnetic tape 130 to the BOT in the partition #0 (head) in step S242 in response to the command.

Figure 35:
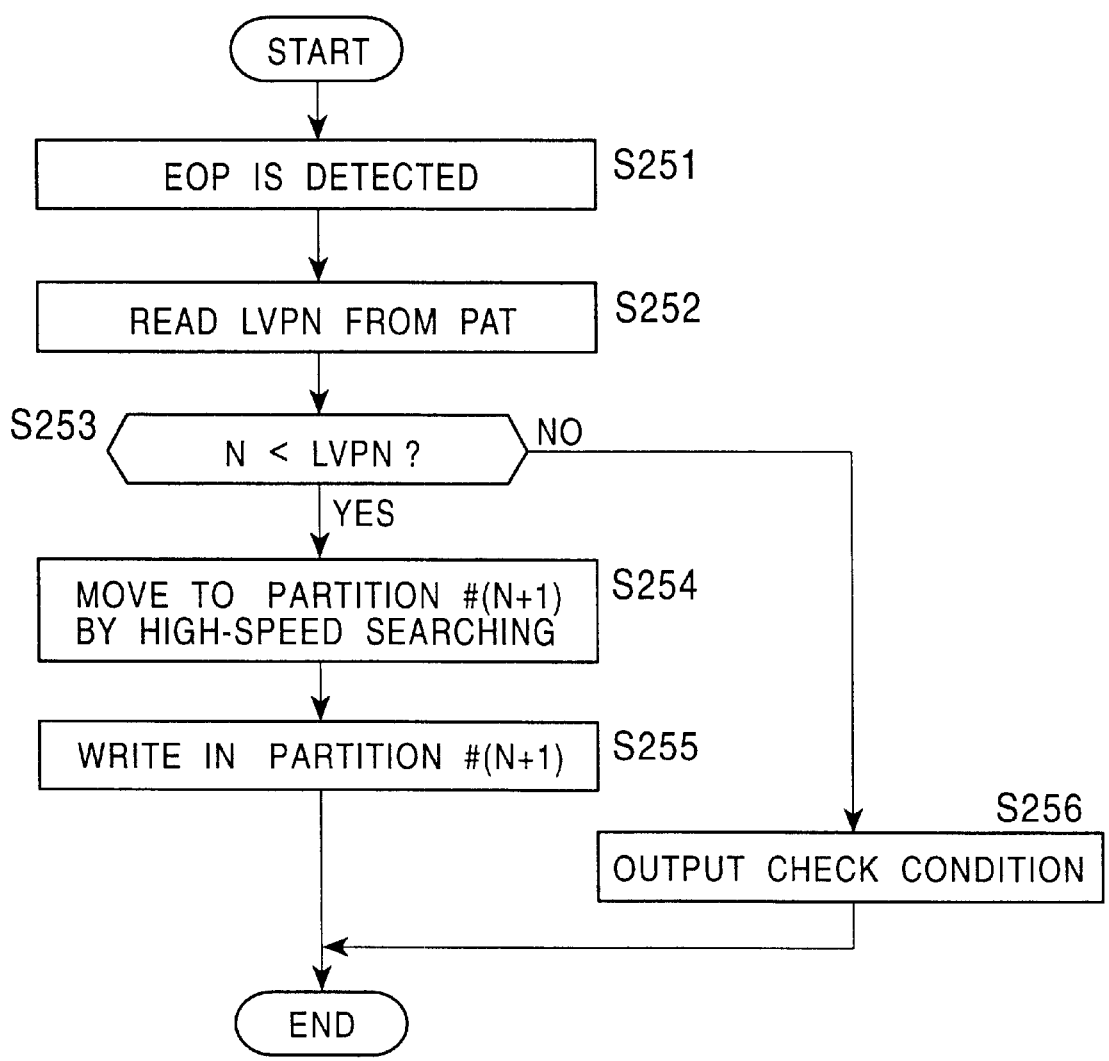
FIG. 35 is a flowchart showing a process upon detection of EOP when writing by the tape streamer device shown in FIG. 3.

FIG. 35 is a flowchart showing a process performed upon detection of the EOP when writing. When the system controller 71 detects the EOP in step S251, the system controller 71 reads, in step S252, the LVPN from the PAT stored in the RAM 72. In step S253, the system controller 71 compares the value of the number N of the partition at the current position and the value of the LVPN read in step S252. When the number N of the partition at the current position is smaller than the LVPN, in step S254, the magnetic tape 130 is moved to the partition #(N+1) by high-speed searching. In step S255, the system controller 71 writes data in the partition #(N+1).

When it is determined in step S253 that the value of the number N of the partition at the current position is equal to or larger than the value of the LVPN, in step S256, the system controller 71 outputs the status of a check condition to the host computer 91.

Figure 36:
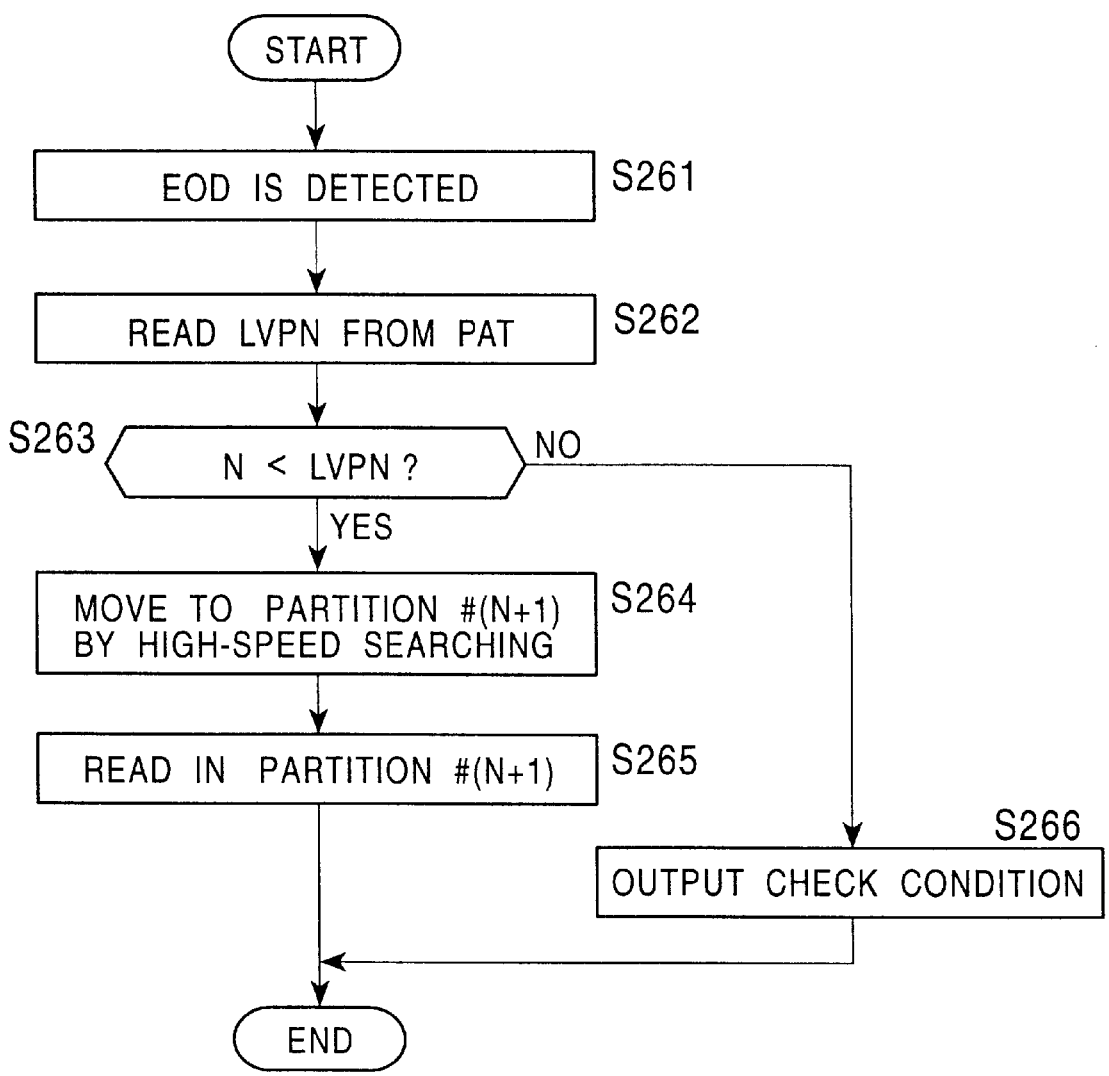
FIG. 36 is a flowchart showing a process upon detection of EOD when reading by the tape streamer device shown in FIG. 3.

FIG. 36 is a flowchart showing a process performed upon detection of the EOD when reading. When the system controller 71 detects the EOD in step S261, the system controller reads, in step S262, the LVPN from the PAT stored in the RAM 72. In step S263, the system controller 71 determines whether the number N of the partition at the current position is smaller than the LVPN stored in the PAT. When the number N is smaller than the LVPN, in step S264, and the magnetic tape 130 is moved to the partition #(N+1) by high-speed searching. In step S265, the system controller 71 reads data from the partition #(N+1).

When it is determined in step S263 that the value of the number N is equal to or larger than the LVPN, in step S266, the system controller 71 outputs the status of the check condition to the host computer 91.

In this manner, when the EOP or the EOD is hit when writing or reading, the writing destination or the reading destination is moved to the next partition as long as the hit EOP or EOD is not the last EOP or EOD. Therefore, the processing similar to the case of a single partition can be performed.

The above series of processes can be performed by hardware or by software. When performing the series of processes by software, a program constructing that software is installed in a computer incorporated in the system controller 71 as exclusive hardware, or in a general-purpose personal computer capable of performing various functions by installing various programs.

Figure 37:
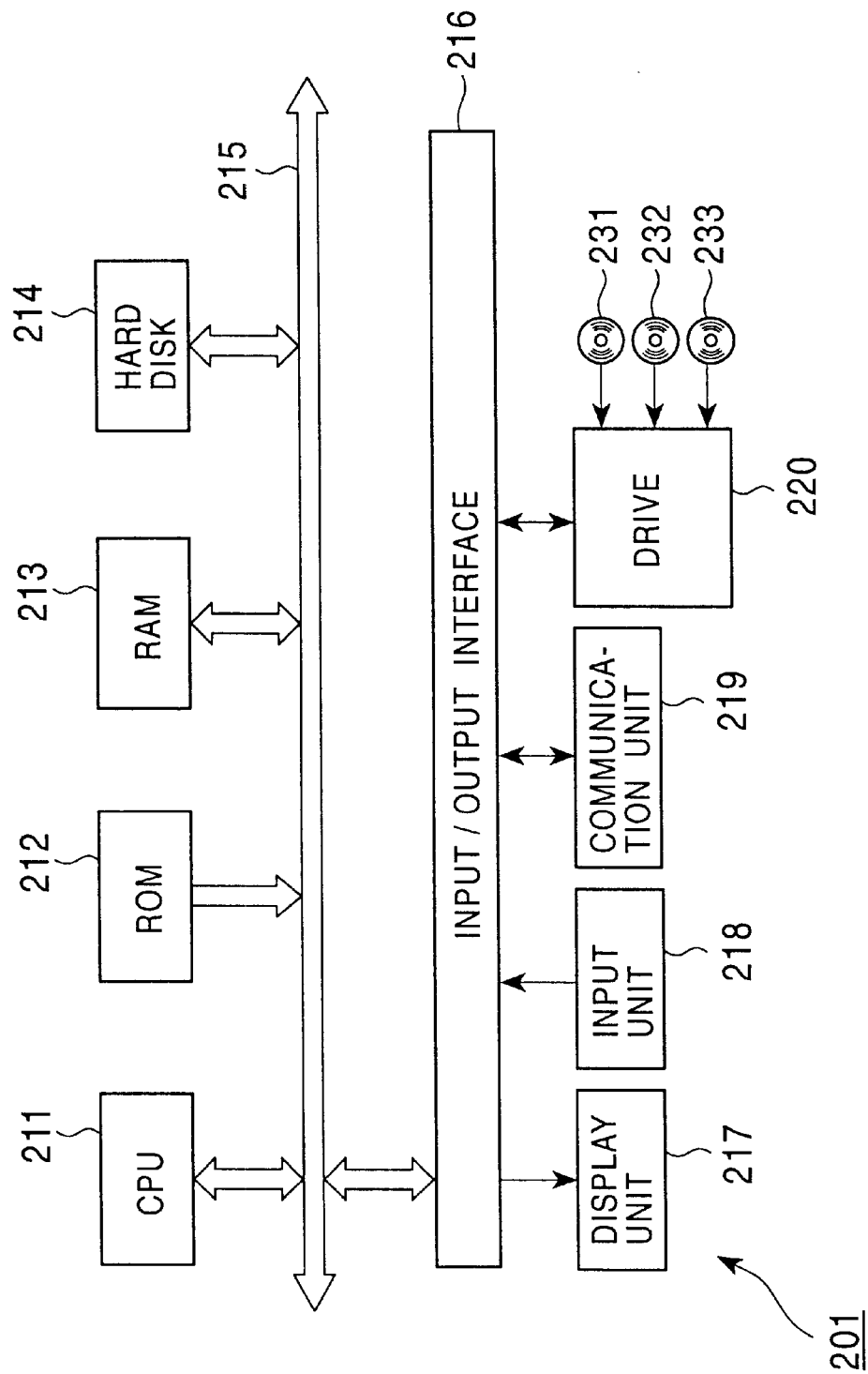
FIG. 37 is an illustration of recording media.

FIG. 37 shows an example of the structure of a general-purpose personal computer 201 in which such a program is installed. An input/output interface 216 is connected to a central processing unit (CPU) 211 via a bus 215. When a user inputs an instruction using an input unit 218 including a keyboard and a mouse, a program (including a program transferred from a medium such as a satellite or a network, which in turn is received by a communication unit 219 and stored in a hard disk 214) recorded in a recording medium, such as the hard disk 214, or a program recorded in a magnetic disk 231, an optical disk 232, or an magneto-optical disk 233 mounted in a drive 220 is loaded to a random access memory (RAM) 213, and the program is run. The CPU 211 outputs the processing result to a display unit 217 including a liquid crystal display (LCD) or a cathode ray tube (CRT) via the input/output interface 216 as circumstances demand.

In this description, steps for writing a program provided by a medium cover not only processing performed in time series in accordance with the written order but also parallel or discrete processing performed not necessarily in time series.

In this description, a system represents the entire device formed of a plurality of units.

Accordingly, in step S44 in FIG. 19, step S57 in FIG. 21, step S82 in FIG. 23, step S103 in FIG. 26, step S123 in FIG. 28, step S143 in FIG. 29, step S163 in FIG. 30, step S183 in FIG. 31, step S213 in FIG. 32, and the like, the current position of the magnetic tape is obtained based on the cumulative values of the counts in each partition. Thus, even though the magnetic tape 130 is a magnetic tape actually having multi-partitions, the host computer 91 can manage the magnetic tape 130 in a manner similar to processing a magnetic tape having a single partition.

As shown in the processing in step S63 in FIG. 22, when the unloading command is input, the magnetic tape is unloaded at the nearest ODA or DA in the reverse direction. Hence, the magnetic tape can be quickly unloaded. As a result, when again loading the unloaded magnetic tape, the magnetic tape can reliably be loaded at the position of the ODA, thus quickly loading the magnetic tape.

What is claimed is:

1. A device for managing reading and writing of data to a magnetic tape, comprising:

dividing means for dividing a single magnetic tape into a plurality of partitions so that non-recording areas, for use in loading and unloading the magnetic tape to and from the device and in which data is not written, are provided between adjacent partitions;

first detection means for detecting a number of predetermined data units in each of the plurality of partitions;

second detection means for detecting cumulative values, starting from a head partition of the plurality of partitions closest to a head end of the magnetic tape, of the number of predetermined data units detected by said first detection means; and arithmetic operation means for performing an arithmetic operation to determine an access position on the magnetic tape based on the number of predetermined data units from a starting point of a partition to which the access position belongs up to the access position and on a sum of the cumulative values detected by said second detection means up to a partition immediately before the partition of the plurality of partitions to which the access position belongs.

2. The device according to claim 1, further comprising:

storage means for storing the number of predetermined data units in each of the partitions;

wherein said first detection means performs detection based on the number of data units stored in said storage means.

3. The device according to claim 1, wherein said first detection means reads the number of data units from a memory pertaining to a cassette containing the magnetic tape.

4. The device according to claim 3, wherein said first detection means reads the number of data units from the memory during a loading operation in which the magnetic tape is being extracted from the cassette.

5. The device according to claim 1, wherein said first detection means detects the number of data units in each of the partitions based on the number of data items written on the magnetic tape and a mark indicating a boundary between the data items.

6. The device according to claim 2, further comprising write means for writing the number of data units in a memory pertaining to a cassette containing the magnetic tape.

7. The device according to claim 6, wherein said write means writes the number of data units in the memory while the cassette is being unloaded from the device.

8. An accessing method for managing a device for reading and writing data to a magnetic tape, said method comprising the steps of:

dividing a single magnetic tape into a plurality of partitions so that non-recording areas, for use in loading and unloading the magnetic tape to and from the device and in which data is not written, are provided between adjacent partitions;

detecting a number of predetermined data units in each of the plurality of partitions;

detecting cumulative values of the detected number of data units starting from a head partition of the plurality of partitions closest to a head end of the magnetic tape; and performing an arithmetic operation to determine an access position on the magnetic tape based on the number of predetermined data units from a starting point of a partition to which the access position belongs up to the access position and on a sum of the cumulative values detected in the step of detecting cumulative values up to a partition immediately before the partition of the plurality of partitions to which the access position belongs.

9. A medium having recorded thereon a program for managing reading and writing of data to a magnetic tape, said program comprising:

a dividing step of dividing a single magnetic tape into a plurality of partitions so that non-recording areas, for use in loading and unloading the magnetic tape to and from a device and in which data is not written, are provided between adjacent partitions;

a first detection step of detecting a number of predetermined data units in each of the plurality of partitions;

a second detection step of detecting cumulative values, starting from a head partition of the plurality of partitions closest to a head end of the magnetic tape, of the number of predetermined data units detected in said first detection step; and an arithmetic operation step of performing an arithmetic operation to determine an access position on the magnetic tape based on the number of predetermined data units from a starting point of a partition to which the access position belongs up to the access position and on a sum of the cumulative values detected in said second detection step up to a partition immediately before the partition of the plurality of partitions to which the access position belongs.

* * * * *